United States Patent
Kim et al.

(10) Patent No.: US 9,888,116 B2
(45) Date of Patent: Feb. 6, 2018

(54) METHOD FOR PROCESSING COMMUNICATION BASED ON USER ACCOUNT AND ELECTRONIC DEVICE THEREFOR

(71) Applicant: Samsung Electronics Co., Ltd., Gyeonggi-do (KR)

(72) Inventors: Jun Young Kim, Gyeonggi-do (KR); Byoung-Taek Min, Gyeonggi-do (KR); Eungseo Shin, Seoul (KR); Bongsu Ko, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/218,196

(22) Filed: Jul. 25, 2016

(65) Prior Publication Data

US 2017/0085706 A1    Mar. 23, 2017

(30) Foreign Application Priority Data

Sep. 18, 2015 (KR) .......................... 10-2015-0132628

(51) Int. Cl.
| | | |
|---|---|---|
| *H04M 3/42* | (2006.01) | |
| *H04M 3/436* | (2006.01) | |
| *H04M 1/2745* | (2006.01) | |
| *H04W 8/18* | (2009.01) | |
| *H04W 4/16* | (2009.01) | |
| *H04W 68/00* | (2009.01) | |

(52) U.S. Cl.
CPC ..... *H04M 3/436* (2013.01); *H04M 1/274508* (2013.01); *H04M 3/42365* (2013.01); *H04W 4/16* (2013.01); *H04W 8/183* (2013.01); *H04W 68/005* (2013.01)

(58) Field of Classification Search
CPC ..... H04W 4/008; H04W 84/10; H04W 24/08; H04W 4/02; H04W 12/08; H04W 24/02; H04W 4/12
USPC .......... 455/41.3, 405, 41.2, 550.1, 509, 418, 455/456.3, 414.1, 466, 73
See application file for complete search history.

(56) References Cited

U.S. PATENT DOCUMENTS

| | | | |
|---|---|---|---|
| 2007/0168425 A1* | 7/2007 | Morotomi ......... | H04M 1/72522 709/204 |
| 2007/0169147 A1* | 7/2007 | Kii ..................... | G11B 27/11 725/38 |

(Continued)

FOREIGN PATENT DOCUMENTS

| | | |
|---|---|---|
| KR | 10-2012-0100111 A | 9/2012 |
| KR | 10-2015-0009025 A | 1/2015 |

*Primary Examiner* — Joseph Arevalo
(74) *Attorney, Agent, or Firm* — Cha & Reiter, LLC.

(57) ABSTRACT

The present disclosure according to various embodiments provides a method and device including: a communication interface; a display; a memory; and a processor electrically connected to the memory, wherein the processor is configured to detect a communication event, search a one or more user accounts for a user account corresponding to the detected communication event, and when the user account corresponding to the detected communication event is in a logged-off state, background process the communication event, and when the corresponding user account is in a logged-on state, foreground process the communication event. In addition, other embodiments are also possible.

20 Claims, 19 Drawing Sheets

(56) References Cited

U.S. PATENT DOCUMENTS

| | | | | |
|---|---|---|---|---|
| 2007/0229518 A1* | 10/2007 | Kii | ................... | G06F 3/0481 345/520 |
| 2010/0097440 A1* | 4/2010 | Lee | ................... | H04N 7/147 348/14.02 |
| 2010/0246591 A1* | 9/2010 | Gobriel | ............... | H04L 12/12 370/412 |
| 2011/0314145 A1* | 12/2011 | Raleigh | ............ | H04L 41/0893 709/224 |
| 2014/0096230 A1* | 4/2014 | Wade | ............. | H04L 63/0272 726/15 |
| 2014/0237595 A1* | 8/2014 | Sridhara | .......... | H04L 63/1408 726/23 |
| 2015/0011189 A1 | 1/2015 | Shin et al. | | |
| 2015/0121506 A1* | 4/2015 | Cavanaugh | ......... | G06F 21/62 726/16 |
| 2015/0189661 A1* | 7/2015 | Lindner | ......... | H04W 52/0277 455/405 |

* cited by examiner

METHOD FOR PROCESSING COMMUNICATION BASED ON USER ACCOUNT AND ELECTRONIC DEVICE THEREFOR

CLAIM OF PRIORITY

This application claims the priority under 35 U.S.C. § 119(a) to Korean Application Serial No. 10-2015-0132628, which was filed in the Korean Intellectual Property Office on Sep. 18, 2015, the entire content of which is hereby incorporated by reference.

TECHNICAL FIELD

Various embodiments relate to a method for processing communication based on a user account and an electronic device for the same.

BACKGROUND

Recently, with the development of a digital technology, various electronic devices capable of processing communication and personal information while moving have been released. These electronic devices may include, for example, such as a mobile communication terminal, Personal Digital Assistant (PDA), an electronic scheduler, a smart phone, a tablet Personal Computer (PC), etc. The electronic devices are provided with various functions such as a voice call, message transmission such as a Short Message Service (SMS)/a Multimedia Message Service (MMS), video calling, an electronic scheduler, e-mail transmission and reception, broadcast reproduction, Internet access, music reproduction, schedule management, a social network service (SNS), a messenger service, a dictionary, and games.

Meanwhile, it may be desirable for an electronic device to be usable in a multi-user environment. The multi-user environment means that a single electronic device is shared by multiple users. However, for the multi-user mode, a main user may wish to place restrictions on applications or communication traffic by other sub-users, the communication functions may still be used by all users. That is, the electronic device does not properly support the multi-user environment because a method for processing communication for each user is not defined.

A problem may occur when a plurality of users share a single electronic device. For example, if three users (for example, A, B, C) share a single electronic device, suppose that user A uses the device, but the electronic device receives an incoming call for user B. User A may have access to the identity of the caller, thereby violating user B's privacy.

SUMMARY

Various embodiments may provide a method and device for effectively managing a communication use authority for each user and protecting the user's privacy in a multi-user environment where a single communication channel is shared.

An electronic device according to various embodiments may include: a communication interface; a display; a memory; and a processor electrically connected to the memory, wherein the processor is configured to detect a communication event, search a one or more user accounts for a user account corresponding to the detected communication event, and when the user account corresponding to the detected communication event is in a logged-off state, background process the communication event, and when the corresponding user account is in a logged-on state, foreground process the communication event. A method for operating an electronic device according to various embodiments may include: detecting a communication event; searching for a user account corresponding to the detected communication event; and when the corresponding user account is in a logged-off state, background processing the communication event, and when the corresponding user account is in a logged-on state, foreground processing the communication event. According to various embodiments, a communication use authority for each user is effectively managed and the user's privacy can be protected in a multi-user environment where a single communication channel is shared.

According to various embodiments, in a multi-user environment where a single electronic device is shared and used by a plurality of user accounts, when a communication is requested with a user account that is logged-off, it may prevent the personal information of the user account that is logged-off from being exposed to a user of the user account that is logged-in.

According to various embodiments, the use authority and use amount for each user can be controlled so that the management cost of the electronic device can be reduced.

According to various embodiments, when a communication event has occurred from a counterpart electronic device, the telephone number of the counterpart electronic device can be retrieved by a cloud server or a personal electronic device as well as an internal database.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
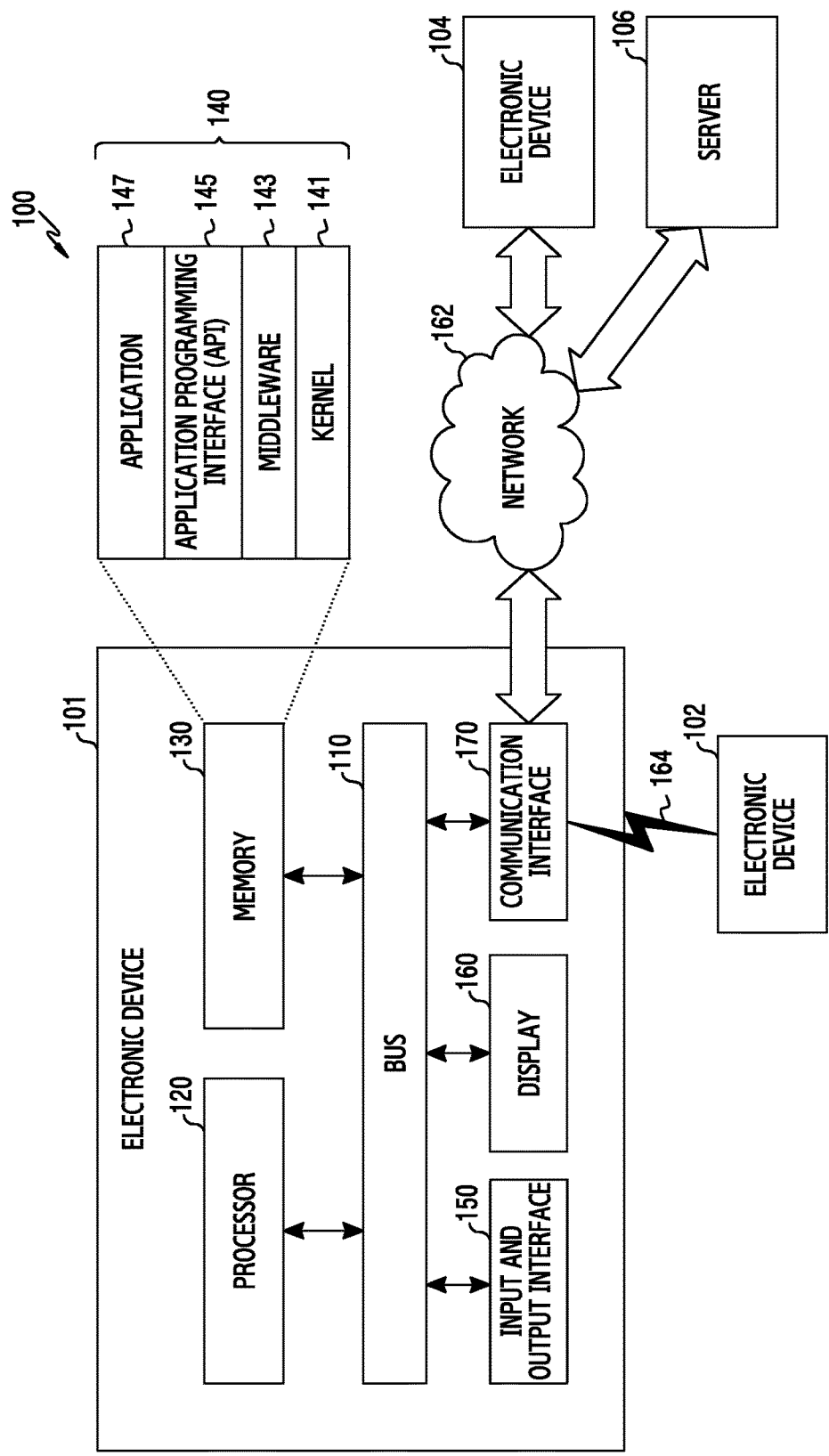
FIG. 1 is a diagram illustrating an electronic device in a network environment according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
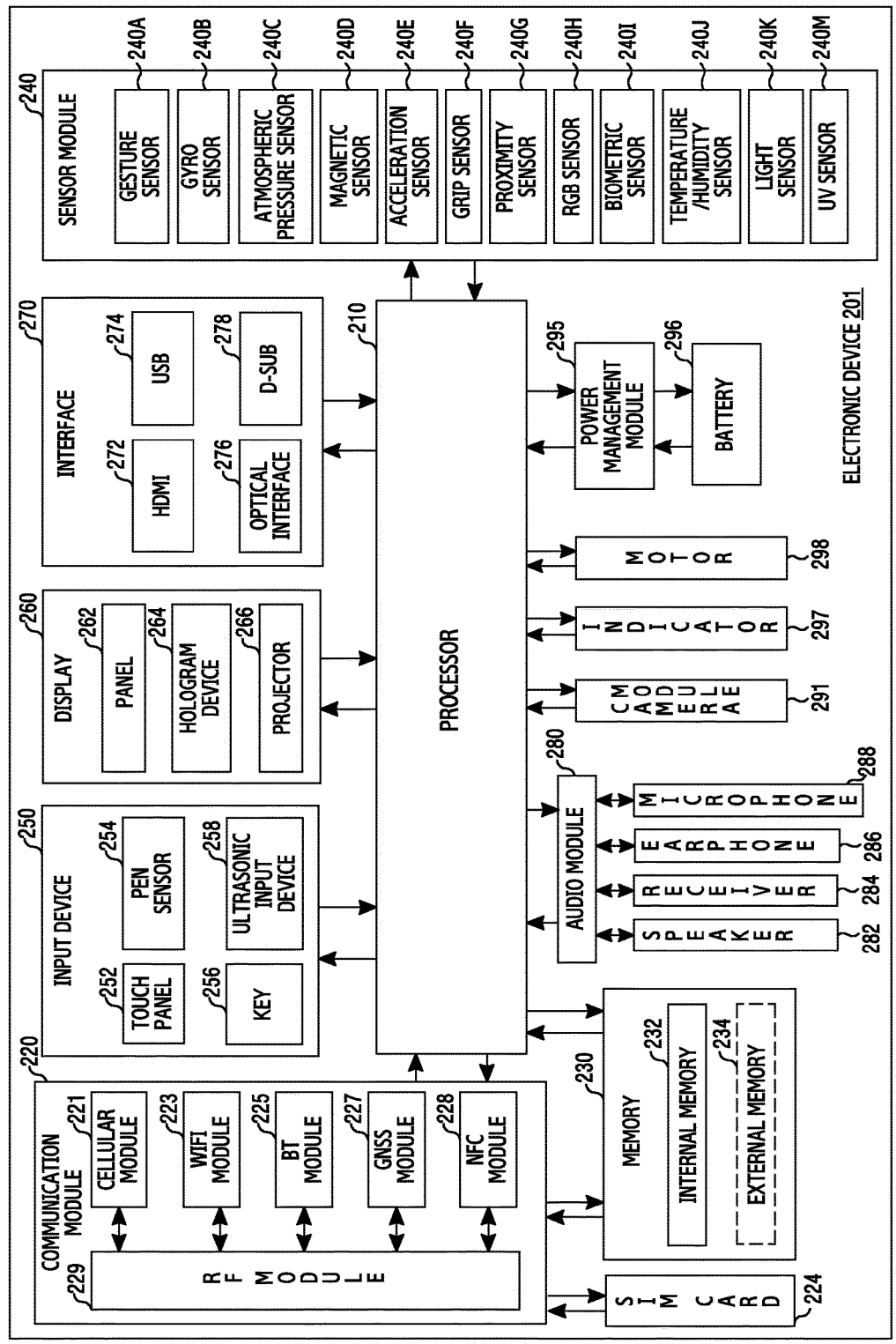
FIG. 2 is a block diagram illustrating a configuration of an electronic device according to various embodiments.

FIG. 2 is a block diagram of an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
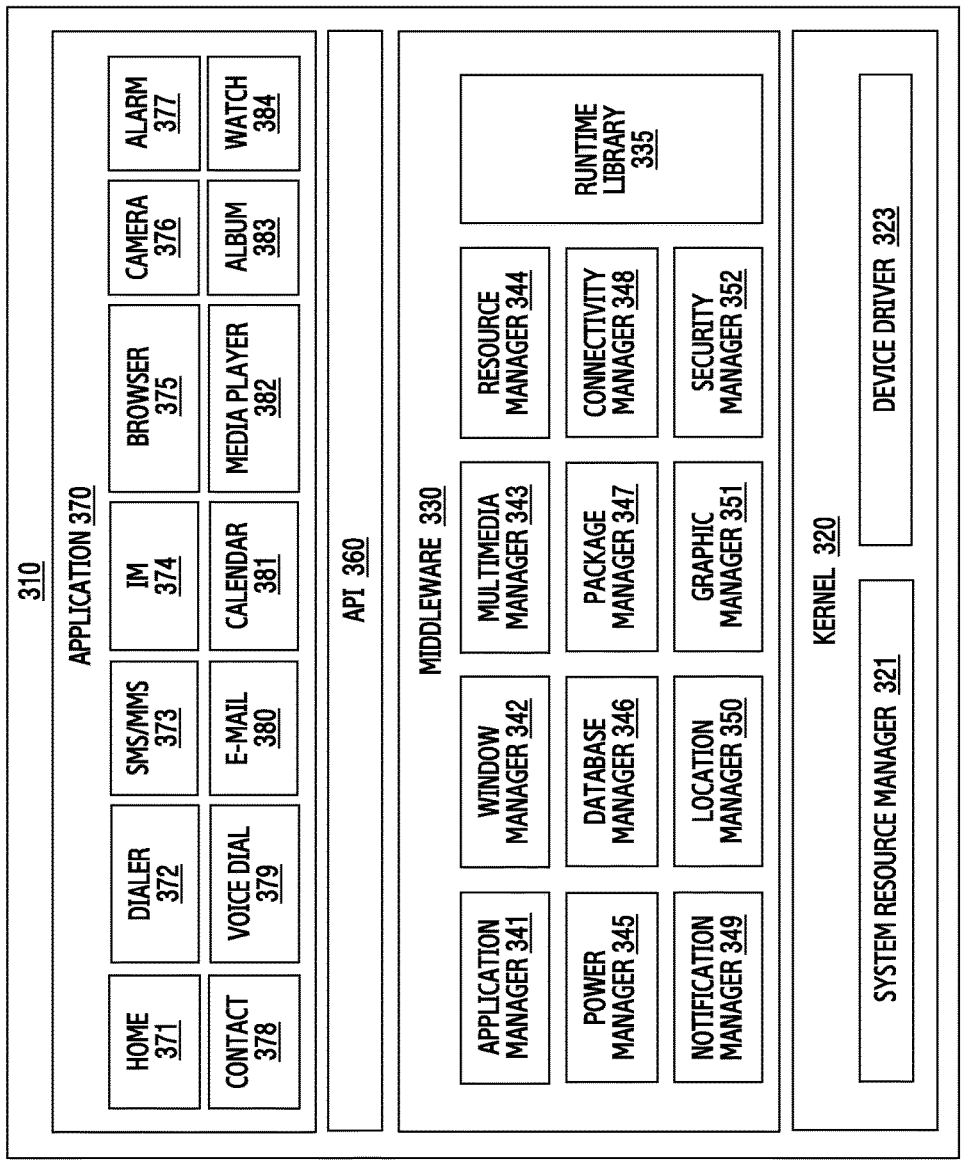
FIG. 3 is a block diagram of a program module according to various embodiments.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, or hardware execution instructions stored in a memory. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Figure 4A:
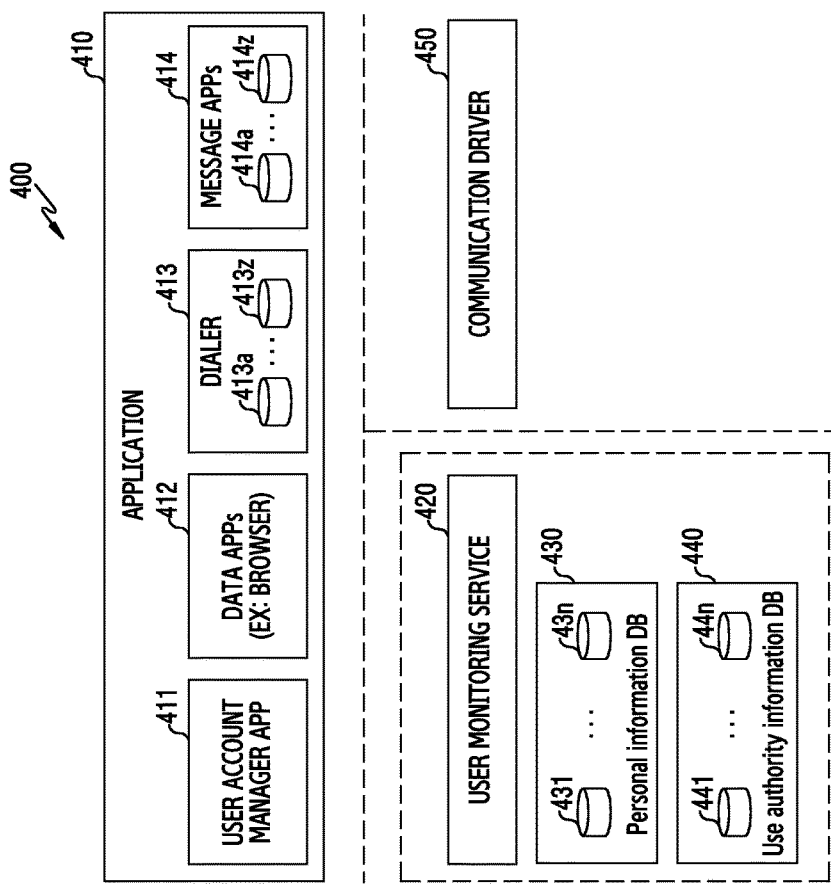
FIG. 4A is a block diagram showing a software architecture according to various embodiments.

FIG. 4A is a block diagram showing a software architecture according to various embodiments.

Referring to FIG. 4A, an electronic device (for example, the electronic device 101 of FIG. 1 or the electronic device 201 of FIG. 2) may include a software architecture 400 for processing a communication event in a multi-user environment. A communication event can include, but is not limited to, a phone call, an SMS text message, a MMS text message, email, a "phone call" from a VOIP service, such as Viber™, or Skype™, an internet texting service, such as WhatsApp™, a tweet from Twitter™, and Facebook™ messages. In the following, for the convenience of explanation, an electronic device is described as the electronic device 101 of FIG. 1, but the electronic device is not limited to the description.

For example, the software architecture 400 may include an application 410, a user monitoring service 420, a personal information DB 430 (or personal information storage unit), a use authority information DB 440 (or use authority information storage unit), or a communication driver 450. The personal information DB 430 and use authority information DB 440 may be included in a single storage unit (for example, memory 130 of FIG. 1). The application 410 can be among the applications 370 in FIG. 3.

The application 410 may refer to an application installed on the electronic device 101. For example, the application 410 may include a user account management application 411, data application 412, a dialer 413, or a message application 414. The user account manager application 411 may be an application for processing a communication event based on a user account. Here, the user account may be an identifier for identifying a user who uses the electronic device 101, such as a user ID. The user account may be registered in the user account management application 411, or may be stored in the use authority information DB 440. The data application 412, the dialer 413, or the message application 414 may refer to a "communications application". The data application 412 may be an executable application when used for data communication, for example, may be a "browser" or "messenger" application.

The dialer 413 is an application which can be executed during telephone communication, and may be, for example, a "telephone" application. In certain embodiments, a dialer 413 can be a telephone application from a VOIP service, such as Viber™, or Skype™. The dialer 413 may include call history DB 413a to 413z for each user account. The call history DB 413a to 413z may include at least one of date and time, a name of the other party, or telephone numbers for the user account-specific outgoing, incoming and missed calls. For example, call history information for a user account AAA may be stored in the call history DB 1 413a, call history information for a user account BBB may be stored in the call history DB 2 (not shown), and call history information for a user account ZZZ may be stored in the call history DB n 413z.

The message application 414 may be an application which can be executed during communication using a Short Message Service (SMS)/Multimedia Message Service (MMS)/Rich Communication Suite (RCS), and may be, for example, a "message" application. In certain embodiments, the message application 414 can internet texting service, such as WhatsApp™. The message application 414 may include message history DB 414a to 414z for each user account. The message history DB 414a to 414z may include at least one of date and time, a name of the other party, a telephone number, or message contents of the user account-specific outgoing/incoming messages. For example, message history information for a user account AAA may be stored in the message history DB 1 414a, message history information for a user account BBB may be stored in the message history DB 2 (not shown), and message history information for a user account ZZZ may be stored in the message history DB n 414z.

The user monitoring service 420 manages user accounts through the user account management application 411. For example, the user monitoring service 420 may check the log-in/log-off state of the user account. Each user may execute the user account manager application 411 so as to log in by inputting the user account. Further, the user monitoring service 420 may check the personal information and use authority information for each user account.

For example, each user who uses the electronic device 101 may execute the user account manager application 411 so as to input personal information for each user account. The personal information may include at least one of a telephone directory, notification setting information, and personal contact associated with each user account. The telephone directory may store a name, telephone number, image, address and as well as other information about each personal contact. When a call or message arrives for a logged-off user, notification setting information determine whether to issue a notification. In addition, the personal contact is a contact is a contact associated with the call or message for the logged-off user. For example, the personal contact can be a telephone number, e-mail, name, or a hashtag. The user monitoring service 420 may store the personal information input to the user account manager application 411 in the personal information DB 430.

The personal information DB 430 may include user account-specific personal information DB. For example, personal information for a user account AAA may be stored in a personal information DB 1 431, personal information for a user account BBB may be stored in a personal information DB 2 (not shown), and personal information for a user account ZZZ may be stored in a personal information DB n 43n.

In addition, an administrator who manages the electronic device 101 may execute the user account manager application 411 so as to input use authority information for each user account. The use authority information may include at least one of a use authority according to a type of communication, communication use amount according to a type of communication, or call restriction information. For example, the communication type may be a voice/video call, a message, and data communication. The use authority information according to the communication type may permit the voice/video call and message, but not permit the data communication. Alternatively, the use authority according to the communication type may permit the voice call and message, but not permit the video call and data communication. The use amount according to a type of communication may be one hour of voice calls, 100 messages, and 5 GB of data. The user authority information can include information such as call restriction information, message restriction information, and data restriction information. The call restriction information may be configured to enable calling for only telephone numbers stored in the telephone directory. The user monitoring service 420 may store the use authority information input to the user account manager application 411 in the use authority information DB 440.

The use authority information DB 440 may include use authority information DB for each user account. For example, the use authority information for a user account AAA may be stored in the use authority information DB 1 411, the use authority information for a user account BBB may be stored in the use authority information DB 2 (not shown), and the use authority information for a user account ZZZ may be stored in the use authority information DB n 44n.

The communication driver 450 is a driver that provides a communication function, and, when there is a request for call/message/data communication from a modem (not shown), the communication driver 450 may perform the corresponding communication function. The communication driver 450 may be controlled by the user monitoring service 420. According to various embodiments, when there is a request for the call/message/data communication to the communication driver 450, the request may be transmitted to the application 410 of which the communication is requested and communicate according to the control of the user monitoring service 420. In certain embodiments, the communication driver 450 can be included in the device driver 323 in the kernel 320.

Figure 4B:
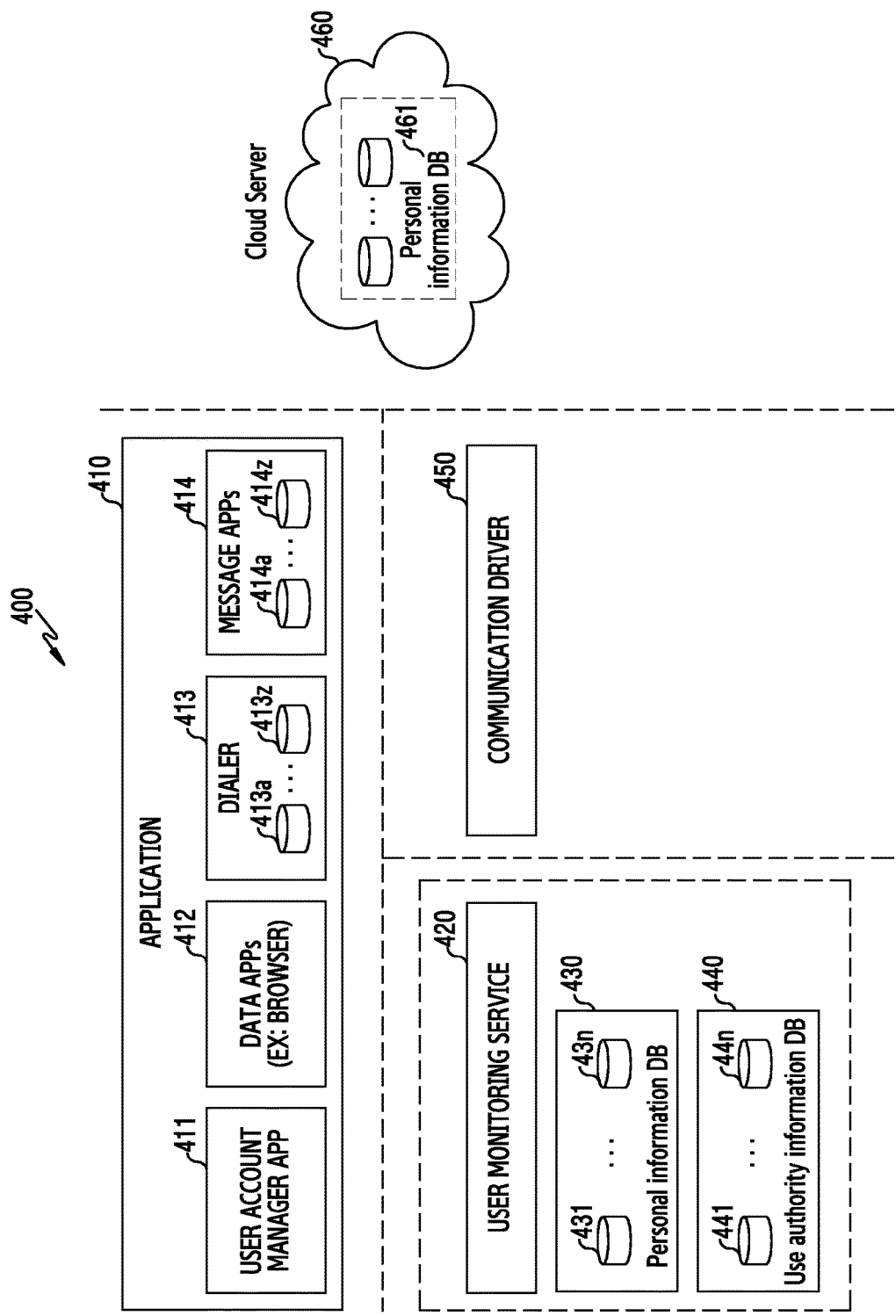
FIG. 4B, FIG. 4C and FIG. 4D are block diagrams showing a software architecture of the electronic device in a network environment according to various embodiment.
Figure 4C:
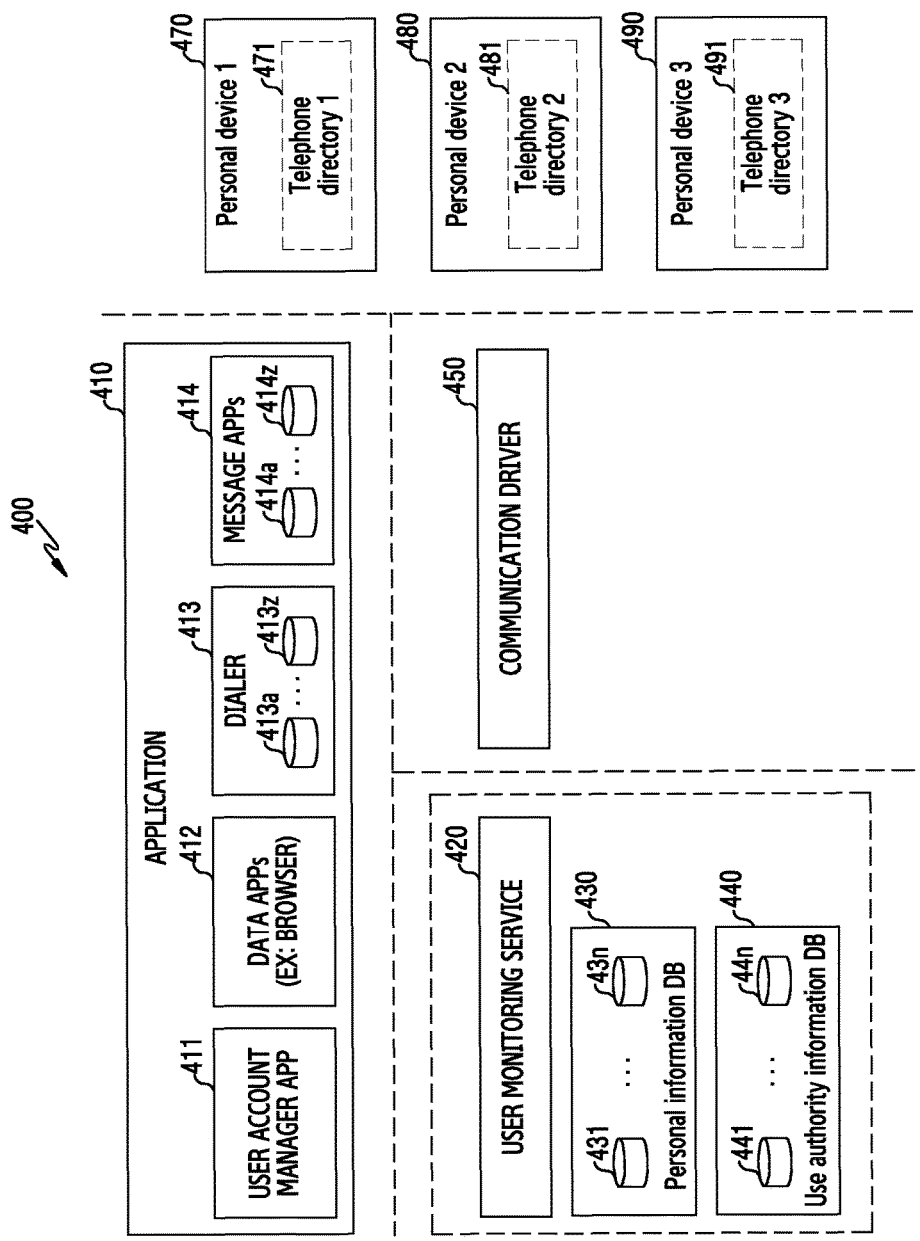
Figure 4D:
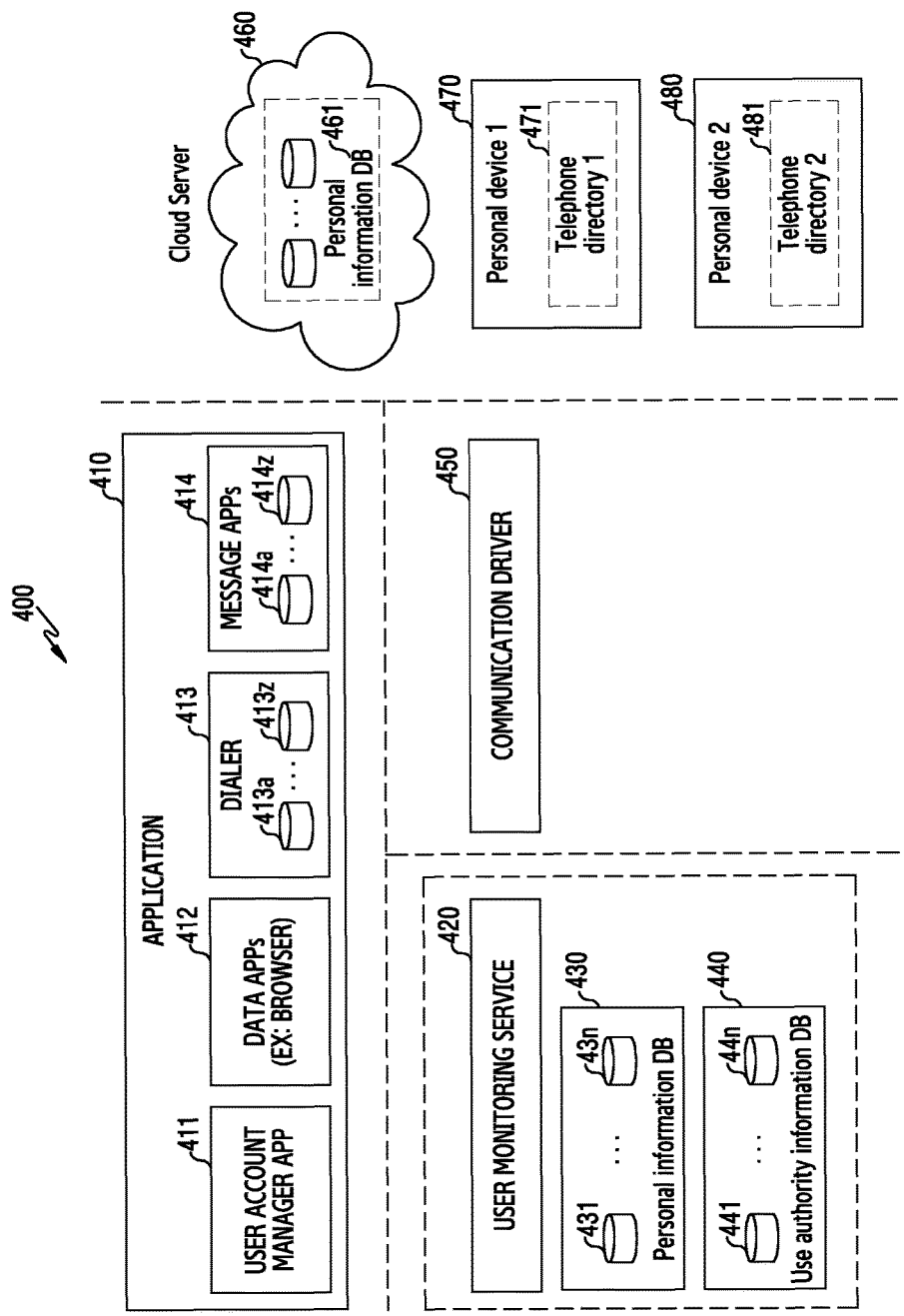

FIG. 4B to FIG. 4D are a block diagram showing a software architecture of the electronic device in a network environment according to various embodiment.

Referring to FIG. 4B, the software architecture 400 may include an application 410, a user monitoring service 420, personal information DB 430 (or personal information storage unit), a use authority information DB 440 (or use authority information storage unit), or a communication driver 450. Description of the software architecture 400 of FIG. 4B has been described in detail through FIG. 4A, and therefore, a description thereof will be omitted in FIG. 4B.

The personal information DB 430 may further include a corresponding user account for a cloud server 460 to each user account. When a telephone number for the communication event is received, the personal information DB 430 is first searched for the telephone number. If the telephone number is not found in the personal information DB is not retrieved from the personal information DB 430, the electronic device 101 may request the cloud server 460 (for example, the server 106 in FIG. 1) to identify the telephone number corresponding to the communication event (for example, the counterpart telephone number).

The cloud server 460 may include personal information DB 461 for each user account of the electronic device 101. The personal information DB 461 of the cloud server 460 may be the same as or different from the personal information DB 430 of the electronic device 101. For example, the user may access the cloud server 460 and create a user account. Here, the creation of the user account of the cloud server 460 may be construed that the user has subscribed as a member to the cloud server 460. The user may be logged into the cloud server 460 using the created user account and register one or more telephone numbers. The cloud server 460 may register or associate the registered one or more telephone numbers to each user account in the personal information DB 461.

The cloud server 460 may receive, from the electronic device 101, a request for identifying the telephone number corresponding to the communication event, through the network 162. The cloud server 460 may identify whether the requested telephone number is stored in the personal information DB 461. The cloud server 460 may transmit the result of the identification to the electronic device 101 as a response to the request. For example, when the requested telephone number is stored in the personal information DB 461, the cloud server 460 may transmit an identification of the user account which has registered the requested telephone number to the electronic device 101 as a response to the request. On the other hand, when the requested telephone number is not stored in the personal information DB 461, the cloud server 460 may transmit a response indicating that there is no identified user account to the electronic device 101.

Accordingly, the electronic device 101 may determine the processing (for example, background processing and foreground processing) for the communication event based on the response received from the cloud server 460. According to various embodiments, when the telephone number according to the communication event is identified, the electronic device 101 may additionally check information stored in the cloud server 460 which has been separately provided as well as personal information DB 430 included inside the electronic device 101.

Referring to FIG. 4C, the software architecture 400 may include an application 410, a user monitoring service 420, a personal information DB 430 (or personal information storage unit), a use authority information DB 440 (or use authority information storage unit), or a communication driver 450. Description of the software architecture 400 of FIG. 4C has been described in detail through FIG. 4A, and therefore, a description thereof will be omitted in FIG. 4C. When a telephone number associated with the communication event is not retrieved from the personal information DB 430, the electronic device 101 which has the software architecture 400 described above may request for the identification of the telephone number corresponding to the event (for example, the counterpart telephone number) using personal information corresponding to each user account stored in the personal information DB 430. The personal information may be a telephone number of a personal device (for example, a personal device 1 470 to a personal device 3 490) corresponding to a user account, and may be an identifier which can find the personal device (for example, the personal device 1 470 to the personal device 3 490) through an IP network, such as the internet, and the like.

For example, the electronic device 101 may send a request to the personal device 1 470 (for example, the electronic device 102 and electronic device 104 of FIG. 1), a personal device 2 480 (for example, the electronic device 102 and electronic device 104 of FIG. 1), or the personal device 3 490 (for example, the electronic device 102 and electronic device 104 of FIG. 1) to identify the telephone number (for example, the counterpart or calling telephone number) corresponding to the communication event. The electronic device 101 may transmit the request for the telephone number corresponding to the communication event in the form of a data packet/SMS. The response to the request may include the telephone number corresponding to the communication event.

Personal devices 470, 480, 490 may include the same or similar elements to those of the electronic device 101. For example, personal devices 470, 480, 490 may be a personal electronic device of each user. In the drawing, three personal devices are shown, and in certain embodiments, the personal device may include as many personal devices as the number of personal contacts stored in the personal information DB 430 of the electronic device 101. For example, when five users share the electronic device 101, five personal devices may be prepared. The personal devices 470, 480, 490 may include telephone directories 471, 481, and 491, respectively. For example, the personal device 1 470 may include information on the telephone numbers of family, friends, and acquaintances of the user 1 in the telephone directory 1 471. The personal device 2 480 may include information on the telephone numbers of family, friends, and acquaintances of the user 2 in the telephone directory 2 481. The personal device 3 480 may include information on the telephone numbers of family, friends, and acquaintances of the user 3 in the telephone directory 3 491. Here, the telephone numbers included in the first telephone book 471, telephone directory 2 481, and telephone directory 3 491 may be the same as, different from each other, or have common numbers.

The personal devices 470, 480, 490 may receive, from the electronic device 101, a request for the identification of the telephone number corresponding to the communication event. Each of the personal devices 470, 480, 490 may identify whether the requested telephone number is in stored in its respective telephone directories 471, 481, 491. The personal devices 470, 480, 490 may transmit the result of the identification to the electronic device 101 as a response to the request. The personal devices 470, 480, 490 may transmit to the electronic device 101 the respective identification results of "Yes (e.g., positive)" or "No (e.g., negative)", or transmit to the electronic device 101 user accounts together with the respective identification results of "Yes" or "No". Here, the user account may be a user account used in the electronic device 101 by each user.

According to various embodiments, when the response is "No", the personal devices 470, 480, 490 may not transmit the response to the electronic device 101. The case can be processed by the settings of the personal devices 470, 480, 490 or user setting. In this case, when the electronic device 101 has not received a response to the request from the personal devices 470, 480, 490 within a predetermined time (for example, one second, three seconds, etc.), the response to the request can be interpreted as "No". This can be processed according to settings within the electronic device 101 or the user setting.

According to various embodiments, the personal devices 470, 480, 490 may process a response to the request on the basis of device setting or user setting. For example, the personal devices 470, 480, 490 may transmit the response without user identification. In this case, the personal devices 470, 480, 490 may transmit the response and then notify of the transmission of the response to the user. On the other hand, the personal devices 470, 480, 490 may inform of the request to the user, and transmit the response to the request when the user permits the request. That is, the personal devices 470, 480, 490 may display the result of the identification to the request, and when the user selects "confirm" or "transmission", the personal devices 470, 480, 490 may transmit a response to the request. On the other hand, the personal devices 470, 480, 490 may display the result of the identification to the request, and when the user selects "refusal" or "cancellation", the personal devices 470, 480, 490 may not transmit a response to the request.

For example, the personal device 1 470 may identify whether the telephone number the same as a requested telephone number stored in the telephone directory 1 471. When the requested telephone number is stored in the telephone directory 1 471, the personal device 1 470 may include a phrase that the telephone number is stored (for example "Yes", "OK", or "Confirm") in a response to the request so as to transmit the response to the electronic device 101. On the other hand, when the requested telephone number is not stored in the telephone directory 1 471, the personal device 1 470 may include a phrase indicating that the telephone number is not stored (for example "No", "not OK", or "Deny") in a response to the request so as to transmit the response to the electronic device 101.

In addition, the personal device 2 480 may identify whether the telephone number the same as a requested telephone number stored in the telephone directory 2 481. When the requested telephone number is stored in the telephone directory 2 481, the personal device 2 480 may include a phrase indicating that the telephone number is stored (for example "Yes", "OK", or "Confirm") in a response to the request so as to transmit the response to the electronic device 101. On the other hand, when the requested telephone number is not stored in the telephone directory 2 481, the personal device 2 480 may include a phrase indicating that the telephone number is not stored (for example "No", "not OK", or "Deny") in a response to the request so as to transmit the response to the electronic device 101.

The personal device 3 490 may identify whether the telephone number the same as the requested telephone number is stored in the telephone directory 3 491. When the requested telephone number is stored in the telephone directory 3 491, the personal device 3 490 may include a phrase indicating that the telephone number is stored (for example "Yes", "OK", or "Confirm") in a response to the request so as to transmit the response to the electronic device 101. On the other hand, when the requested telephone number is not stored in the telephone directory 3 491, the personal device 3 490 may include a phrase indicating that the telephone number is not stored (for example "No", "not OK", or "Deny") in a response to the request so as to transmit the response to the electronic device 101.

Accordingly, the electronic device 101 may determine the processing (for example, background processing and foreground processing) for the communication event based on the response received from the personal devices 470, 480, 490. According to various embodiments, when the telephone number according to the communication event is identified, the electronic device 101 may additionally check information stored in the personal devices as well as personal information DB 430 included inside the electronic device 101.

Referring to FIG. 4D, the software architecture 400 may include an application 410, a user monitoring service 420, personal information DB 430 (or personal information storage unit), a use authority information DB 440 (or use authority information storage unit), or a communication driver 450. Description of the software architecture 400 of FIG. 4D has been described in detail through FIG. 4A, and therefore, a description thereof will be omitted in FIG. 4D. When a telephone number for the communication event is not retrieved from the personal information DB 430, the electronic device 101 which has the software architecture 400 described above may request the cloud server 460 or the personal devices 470, 480, 490 to identify the telephone number corresponding to the communication event (for example, the counterpart telephone number).

Electronic device 101 may simultaneously request the cloud server 460 and the personal devices 470, 480, 490 to identify the telephone number corresponding to a communication event. On the other hand, the electronic device 101 may set the priorities of the cloud server 460 and the personal devices 470, 480, 490, and successively request for the identification of the counterpart telephone number based on the set priorities. The electronic device 101 may determine, on the basis of the response to the request, the transmission of the request to one of the cloud server 460 or the personal devices 470, 480, 490, which is not transmitting the request.

For example, the cloud server 460 may have a higher priority than the personal devices 470, 480. In this case, the electronic device 101 may make a request for identifying the telephone number corresponding to the communication event to the cloud server 460, and determine whether to transmit the request to the personal devices 470, 480 according to the response result received from the cloud server 460. For example, when receiving, from the cloud server 460, a phrase of "the requested telephone number has been stored" or a response including "user account", the electronic device 101 may not transmit the request to the personal devices 470, 480. For example, when receiving, from the cloud server 460, a phrase, such as, "the requested telephone number has not been stored" or a response including "user account", the electronic device 101 may transmit the request to the personal devices 470, 480.

In another embodiment, the personal devices 470, 480 may have a higher priority than the cloud server 460. In this case, the electronic device 101 may make a request for identifying the telephone number corresponding to the communication event to the personal devices 470, 480, and determine whether to transmit the request to the cloud server 460 according to the response result received from the personal devices 470, 480. For example, when receiving, from the personal devices 470, 480, a phrase indicating "the requested telephone number has been stored" or a response indicating "user account", the electronic device 101 might not transmit the request to the cloud server 460. On the other hand, when receiving, from the personal devices 470, 480, a response including a phrase of "the requested telephone number is not stored", the electronic device 101 may transmit the request to the cloud server 460.

According to various embodiments, the electronic device 101 may make a request for identifying the telephone number corresponding to the communication event to the personal devices 470, 480 through the cloud server 460. In this case, the electronic device 101 may transmit, to the cloud server 460, a request including the telephone number corresponding to the communication event and the user account information registered in the electronic device 101. The user account information may be telephone numbers of personal devices 470, 480, or may include identifiers of the personal devices 470, 480, such as IP. The cloud server 460 may make a request for the identification for the telephone number corresponding to the communication event to the personal devices 470, 480, on the basis of the user account information. The cloud server 460 may receive a response to the request from the personal devices 470, 480 and transmit the response to the electronic device 101.

Accordingly, the electronic device 101 may determine the processing (for example, background processing and foreground processing) for the communication event based on the response received from the cloud server 460 or personal devices 470, 480.

An electronic device according to various embodiments may include: a communication interface; a display; a memory; and a processor electrically connected to the memory, wherein the processor is configured to detect a communication event, search for a user account corresponding to the detected communication event, and when the retrieved user account is in a log-off state, background processing the communication event, and when the retrieved user account is in a log-on state, foreground processing the communication event.

The memory may store personal information including at least one of a telephone directory for each user account, notification setting information, or personal contacts, and the processor may be configured to identify which telephone directory includes a telephone number corresponding to the counterpart telephone number associated with the communication event, and search for a user account in which the identified telephone directory is stored.

When the retrieved user account is in a log-off state, the processor may be configured to determine whether there is a user account that is logged in, and when there is a user account that is logged-in, the processor may be configured to background process or foreground process the communication event according to the notification setting information associated with a user account that is logged-off.

In certain embodiments, foreground processing can include accepting inputs and providing outputs through the input/output interface 150 (virtual keyboard, menus, display) while background processing can include processing that does not accept inputs or provide outputs through the input/output interface 150.

When the notification setting associated with the user account that is logged-off is blocked, the processor may be configured to block the communication event and not to display the communication event on the display.

When the notification setting associated with the user account that is logged-off is permitted, the processor may be configured to permit the communication event and to display the communication event on the display.

When the retrieved user account is in a log-off state, the processor may be configured to perform at least one of 1) transmitting communication information associated with the communication event to electronic devices of the personal contacts corresponding to the user account that is logged-off, 2) transmitting absence notification message to the counterpart electronic device associated with the communication event, and 3) storing communication information associated with the communication event in the communication history storage unit of the user account that is logged-off.

The memory may store use authority information including at least one of a use authority according to the communication type for each user account, the use amount according to the communication type, or call restriction information, and the processor may be configured to deduct the usage from the use amount of the user account that is logged-off.

The processor may determine whether the communication information or the absence notification message can be transmitted, by using the use amount of the user account that is logged-off, and when the transmission thereof is not possible, the processor may be configured to adjust the use authority information of the user account that is logged-off by identifying the use authority information of each user account, and deduct, from the use amount of the adjusted use authority information, the use amount according to the transmission of the communication information or transmission of the absence notification message.

When the retrieved user account includes a user account that is logged-in and a user account that is logged-off, the processor may be configured to display the communication event on the display, and transmit the communication information associated with the communication event to electronic devices of personal contacts corresponding to the user account that is logged-off.

The processor may be configured to display the communication event on the display, and, according to the user's selection, transmit the communication information associated with the communication event to electronic devices of personal contacts corresponding to the user account that is logged-off, or store the communication information in the communication history storage unit of the user account that is logged-off.

When the telephone number corresponding to the counterpart telephone number associated with the communication event is not retrieved from the memory, the processor may be configured to make a request for identification of the telephone number of the counterpart to the cloud server or electronic devices of personal contacts, and determine the processing of the communication event on the basis of the response.

The processor may be configured to set the priority to the cloud server or electronic devices of the personal contacts, successively requesting the identification of the telephone number of the counterpart on the basis of the set priority, and determine, on the basis of the response to the request, the transmission of the request to one of the cloud server or an electronic device for each personal contact from which the request is not sent.

Figure 5A:
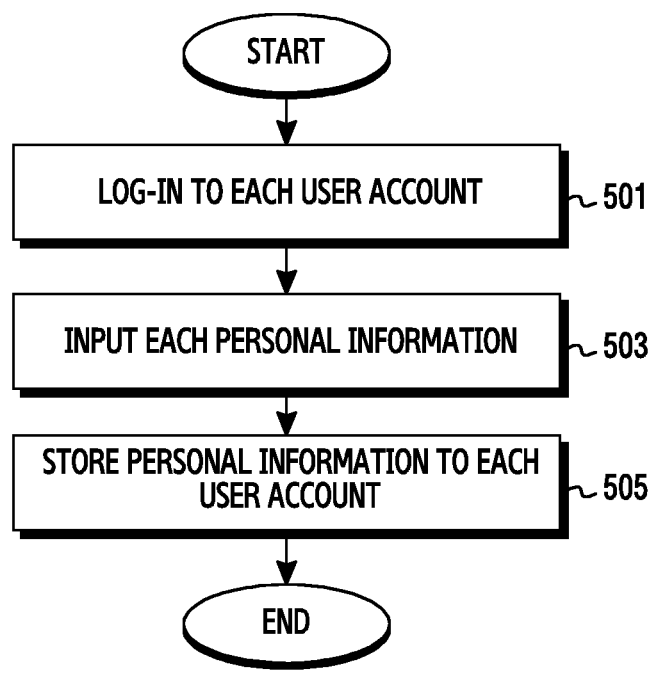
FIG. 5A and FIG. 5B are flow charts illustrating a method for setting user account-specific information according to various embodiments.
Figure 5B:
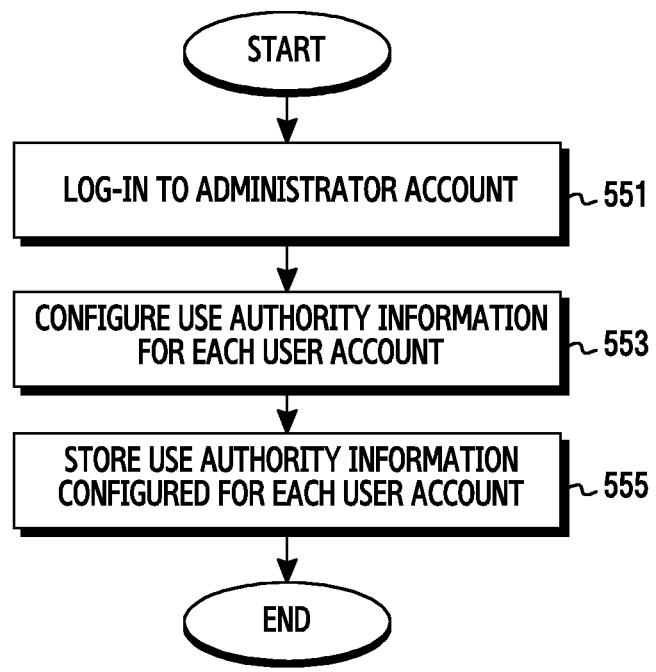

FIG. 5A and FIG. 5B are flow charts illustrating a method for configuring user account-specific information according to various embodiments.

FIG. 5A is a flow chart illustrating a method for inputting personal information.

Referring to FIG. 5A, in operation 501, the processor 120 may perform a login operation for each user account. The processor 120 may ask the user to input an account when the power of the electronic device 101 is turned on. On the other hand, the processor 120 may ask the user to input an account onto a lock screen. In certain embodiments, a lock screen can be a screen that restricts access to applications until a password or other authentication is performed. When performing the login, the processor 120 may automatically execute the user account management application 411 so as to receive an input of an account through the user account management application 411. The processor 120 is configured to allow a user to log into a user account when the input account is the user account. The processor 120 may also ask for a password input while requesting an account input. When the correct user account or password is input, the processor 120 may allow a user to log into the user account.

In operation 503, the processor 120 may receive personal information as input. For example, the processor 120 may receive, through the user account management application 411, an input of personal information from the user who is logged into his user account. Viewing and editing of the personal information is permitted only using the user account into which the personal information is input, and the personal information may not be provided to other users. The personal information may include at least one of a telephone directory, notification setting information, and personal contacts associated with each user account. The personal information may further include a user account of a cloud server associated with each user account according to different embodiments. The telephone directory may store phone numbers of the other parties such as the user's family, friends and acquaintances. For example, the telephone directory may store information regarding the other party, such as a name, phone number, image, address, and email.

When the call or message arrives for the logged-off user, the notification setting information is configured to determine whether to the electronic device 101 should make a call notification or message notification to a currently logged-in user. When the notification is set to 'blocked', the currently logged-in user may not be notified thereof. When the notification is set to 'permitted', the currently logged-in user may be notified thereof. According to various embodiments, the notification setting may be differently set for each telephone number stored in the telephone directory. For example, the notification setting may be blocked for some phone numbers of the phone numbers stored in the telephone directory, and the notification setting may be allowed for some phone numbers. The notification setting information may be set by the user.

In addition, when the phone call or message arrives for the logged-off user, the personal contact may be contacts which can notify of the income of phone calls or messages (e.g., phone numbers, email, etc.) to the logged-off user. According to various embodiments, regardless of the notification settings (blocked/permitted), when the phone call or message arrives for the logged-off user, the logged-off user can be notified of the arrival of the phone calls or messages. In certain embodiments, when the notification is permitted, the electronic device may only notify the logged in user, while only notifying the logged-off user if the notification is blocked.

In operation 505, the processor 120 may store the personal information input for each user account in the personal information DB 430. When the input of the personal information is completed in operation 503, the processor 120 may store the input personal information in the personal information DB 430 associated with the user account. For example, when a user whose user account AAA logs in to input the personal information, the processor 120 may store personal information with the user account AAA in the personal information DB1 431. When a user whose user account BBB logs in to input the personal information, the processor 120 may store personal information with the user account BBB in the personal information DB2 (not shown). When a user whose user account ZZZ logs in to input the personal information, the processor 120 may store personal information with the user account ZZZ in the personal information DBn (43n).

FIG. 5B is a flow chart illustrating a method for configuring use authority information.

Referring to FIG. 5B, in operation 551, the processor 120 may allow a user to log into an administrator account. An administrator account can be a user account that can make changes that will affect other users, such as security settings, installation of software, and access all files. The administrator account can also make changes to other user accounts. According to various embodiments, one of the user accounts is set as an administrator account, or an account different from the user account may be set as the administrator account. The processor 120 may ask the user to input an account when the electronic device 101 is powered on. On the other hand, the processor 120 may ask the user to input an account onto a lock screen. When performing login, the processor 120 may automatically execute the user account management application 411 so as to receive an input of an account through the user account management application 411. The processor 120 may allow a user to log into an administrator account when the input account is the administrator account. The processor 120 may also ask for a password input while requesting an account input. When the correct administrator account or password is input, the processor 120 may allow the user to log into the administrator account.

In operation 553, the processor 120 may configure use authority information for each user account. That is, the processor 120 may configure different use authority information for each user account. For example, the processor 120 may receive, through the user account management application 411, use authority information from the administrator who logged-in with the administrator account. The use authority information may include at least one of a use authority according to the communication type, the use amount according to the communication type, or call restriction information. For example, the communication type may be a voice/video call, a message, and data communication. The use authority may permit the voice/video call and message, but not permit the data communication. In addition, all communication types are allowed but may be limited in the use amount. The use amount according to the communication type may be a one hour of voice call, 100 messages, and 5 GB of data.

The call restriction configuration information may configure the electronic device 101 to enable calling to only phone numbers stored in the telephone directory. According to various embodiments, when the call restriction is set, the number of phone numbers capable of being stored in the telephone directory can be limited. For example, when the call restriction is set, the number of telephone numbers which can be stored in the telephone directory may be limited to a total of 10. On the other hand, even if the call restriction is set, there is no limitation of the number of the telephone number which can be stored in the telephone directory and the call restriction may be configured to enable the calling to a limited number of the telephone numbers. For example, a total of 100 telephone numbers are stored in the telephone directory, and the call restriction may be set to enable the calling to only phone numbers to which a shortcut key is set. On the other hand, the call restriction may be configured to enable the calling of only a few telephone numbers pre-selected by the user. The call restriction may be used as a method for restricting communication of the user account by the administrator.

In operation 555, the processor 120 may store the use authority information set for each user account in the use authority information DB 440. When the input of the use authority information is completed in operation 553, the processor 120 may store the input use authority information in the use authority information DB 440 associated with the user account. For example, the processor 120 may store use authority information, which is configured for a user account AAA, in the use authority information DB1 441. The processor 120 may store use authority information, which is configured for a user account BBB, in the use authority information DB2 (not shown). The processor 120 may store use authority information, which is configured for a user account ZZZ, in the use authority information DBn (44*n*).

According to various embodiments, the use authority information may also be remotely set. For example, for a remote setting, a custom Device Management (DM) command is defined according to each authority, and the remote setting can be made through the command.

Figure 6:
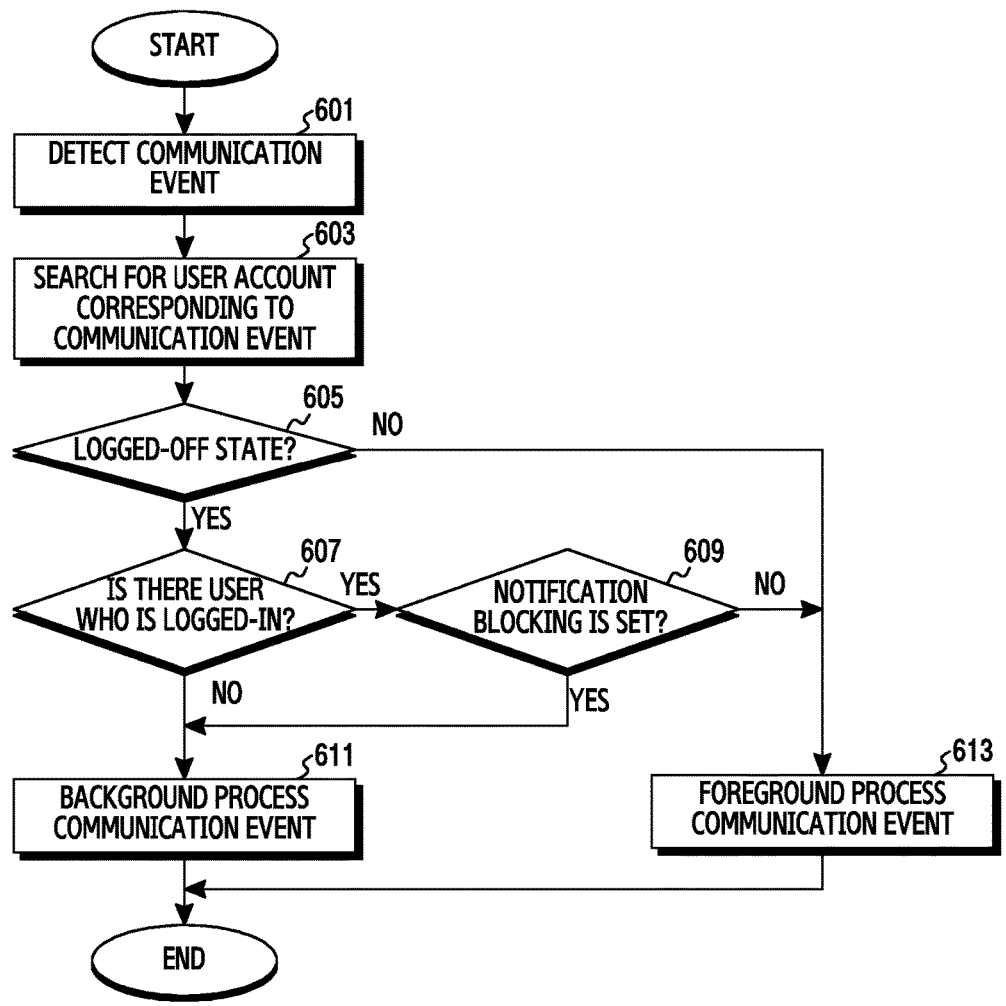
FIG. 6 is a flow chart illustrating a method for processing a communication event in a multi-user environment according to various embodiments.

FIG. 6 is a flow chart illustrating a method for processing a communication event in a multi-user environment according to various embodiments.

Referring to FIG. 6, in operation 601, the processor 120 may detect a communication event. The communication event may include an incoming or outgoing request for communication types (for example, call/message/data). For example, the communication event of the call may include a reception request for the incoming call from the counterpart electronic device (for example, an electronic device that originates the counterpart's phone number) and an outgoing call request by selecting a "call" button on the user interface of the dialer 413 by the user. The communication event of the message may include a reception request for receiving the message from the counterpart electronic device and a transmission request by selecting "transmission" button, on the user interface of the message application 414 by the user. The user monitoring service 420 may detect incoming or outgoing of the communication event through the communication driver 450. The communication event of the data may be for selecting and executing an application for data communication by the user. The user monitoring service 420 may detect the communication event through which the data application 412 is executed or not.

In operation 603, the processor 120 may retrieve the user account corresponding to the detected communication event. For example, when the communication event corresponds to an incoming call, the processor 120 may determine whether the telephone number of the counterpart electronic device which made the outgoing call matches the telephone number stored in the personal information DB 430. For example, when the communication event corresponds to the reception of the message, the processor 120 may determine whether the telephone number of the counterpart electronic device, which has transmitted the message, matches the telephone number stored in the personal information DB 430. On the other hand, when the communication event corresponds to data communication, the processor 120 may determine who is currently logged in with their user account. The user monitoring service 420 may retrieve the user account corresponding to the detected communication event using the personal information DB 430.

According to various embodiments, when no user has stored a telephone number matching the counterpart's telephone number of the communication event, the processor 120 may process the communication event according to the administrator setting or user setting. For example, when no user account storing a telephone number matching the counterpart's telephone number of the communication event is retrieved, the processor 120 may display the communication event on the user interface. That is, regardless of whether the electronic device 101 is in the log-on state or the log-off state, the processor 120 may display the communication event on the user interface.

On the other hand, when no user account has stored a telephone number matching the counterpart's telephone number of the communication event is retrieved, the processor 120 may neglect the communication event. Neglecting of the communication event may mean that the communication event is blocked and the communication event is not displayed on the user interface. That is, when the call or text message is coming from the telephone number that is not registered in any telephone directory, the processor 120 may automatically block the call or text message. When the call or text message is blocked, there is no text is displayed on the screen of the electronic device 101 and no beep, vibration notification, or other alert occurs.

According to various embodiments, when no user account who has stored a telephone number matching the counterpart's telephone number of the communication event is retrieved, the processor 120 may or may not store the counterpart's telephone number in the communication history DB of all user accounts. The communication history DB may include telephone history DBs 413a to 413z and message history DBs 414a to 414z.

According to various embodiments, when no user account who has stored a telephone number matching the counterpart's telephone number of the communication event is retrieved, the processor 120 may make a request for identifying the counterpart's telephone number to the cloud server 460 or electronic devices of individual personal contacts (for example, personal devices 470, 480, 490). At this time, the processor 120 may simultaneously request the cloud server 460 and the personal devices 470, 480, 490 to identify the counterpart's phone number. On the other hand, the processor 120 may simultaneously request the cloud server 460 and the personal devices 470, 480, 490 to successively identify the counterpart's telephone number on the basis of a predetermined priority. The processor 120 may receive a response to the request from the cloud server 460 or personal devices 470, 480, 490 and determine the processing (for example, background processing and foreground processing) of the communication event on the basis of the response.

In operation 605, the processor 120 may determine whether the retrieved user account is in a log-off state. For example, processor 120 may determine whether a user account who has stored a telephone number matching the counterpart's telephone number in the personal information DB 430 is in the log-off state. The user monitoring services 420 may determine whether the retrieved user account is logged-in to the user account management application 411.

In a log-off state (where the condition 605 is "Yes"), the processor 120 may perform an operation 607, and in the log-on state (condition 605 is "No"), the processor 120 may perform an operation 613.

According to various embodiments, the processor 120 may determine whether the user account is in a log-off state on the basis of the response received from the cloud server 460 or personal devices 470, 480, 490. For example, when the counterpart's telephone number is stored in the cloud server 460 or personal devices 470, 480, 490, the processor 120 may determine whether a user account storing the counterparty's telephone number is in a log-off state. On the other hand, when the counterpart's telephone number is not stored in the cloud server 460 or personal devices 470, 480, 490, the processor 120 may determine the operation 613 is to be performed.

In the log-off state, in operation 607, the processor 120 may determine whether there is a user account that is currently logged in. For example, the user monitoring service 420 may check the account management application 411 so as to determine whether there is a user account that was logged in. Even when a user account AAA stores a telephone number that matches to the counterparty's telephone number, the processor 120 may identify that a user account BBB is currently logged-in. On the other hand, by checking the user account management application 411, even when the user account AAA stores the telephone number that matches to the counterpart's telephone number, the processor 120 may identify that there is no one who currently logged in.

The processor 120 may perform the operation 609 when there is a user account that was logged in (condition 607 is "Yes"), and perform operation 611 when there is no user account that was logged in (condition 607 is "No").

When there is a user account that was logged-in, the processor 120 may determine whether the notification blocking is set to the user account that is logged-off, in operation 609. The user monitoring service 420 may determine whether the notification setting information associated with the user account that is logged-off and stored in the personal information DB 430 is in the state of being blocked or permitted.

When the notification is set to "blocked" (condition 609 is "Yes"), the processor 120 may background process the communication event in operation 611. The background process may block the communication event and might not display the communication event. For example, the blocking of the communication event means that an outgoing call is not permitted, when the communication event corresponds to the outgoing call. The user monitoring service 420 may control the communication driver 450 so as to prevent the call from being originated. When outgoing call is restricted, the user monitoring service 420 may display a call restriction notification message. The call restriction notification message may be displayed in the form of a user interface, such as a pop-up window.

In addition, when the communication event corresponds to call reception, the blocking of the communication event means that the communication event (e.g., reception information) is not displayed on the user interface. The communication information may include at least one of incoming or outgoing communication, the telephone number of the counterpart electronic device, and communication date and time, and communication content (for example, content of the message). When background processing is performed, the processor 120 may transmit communication information on the communication event to the personal contact of the user account that is logged-off. One or more user accounts may be in the logged-off state, and the processor 120 may transmit the communication information on the communication event to the personal contacts of one or more user accounts that are logged-off. In addition, when the background processing is performed, the processor 120 may transmit, to a counterpart electronic device, a message indicating that the user of the user account that is logged-off is absent. The user monitoring service 420 may control the communication driver 450 to transmit the communication information or transmit absence notification message.

According to various embodiments, when the absence notification message is transmitted, the processor 120 may update the use authority information according to the administrator setting. For example, the processor 120 may reduce the number of messages by one, which is associated with the user account that is logged-off, every time when the absence notification message is transmitted. On the other hand, even in a case where the absence notification message is transmitted, the processor 120 may not update the use authority information associated with the user account that is logged-off.

According to various embodiments, the processor 120 may transmit the absence notification message to all counterpart electronic devices. The absence notification message may include content of message, such as "You cannot reach the user because he/she is logged-off." For example, when the call or message comes in to the user account that is logged-off, the processor 120 may transmit the absence notification message to all of the counterpart electronic devices regardless of telephone numbers of the counterpart electronic devices. On the other hand, the processor 120 may transmit the absence notification message to only some of the counterpart electronic devices. For example, when the call or message comes in to the user account that is logged-off, the processor 120 may transmit the absence notification message to only the counterpart electronic devices corresponding to their phone numbers of 010-1234-5678 or 010-1142-4567.

In addition, when it is determined that the user account is in a logged-off state or the notification blocking is not set to the user account, the processor 120 may foreground process the communication event in operation 613. The foreground process (foreground process) may permit the communication event and display the communication information on the communication event on the user interface. If the communication event to the user account that is logged-off has occurred, the processor 120 may transmit the communication information to the personal contact of the user account that is logged-off.

That is, with respect to a communication event occurring in a state where no one is logged in (all user accounts are in the logged-off state), the processor 120 may transmit the communication information to the personal contact of a user account which has stored the telephone number matching the counterpart's telephone number in the telephone directory. At this time, the processor 120 may transmit, to the counterpart electronic device, a message indicating that the user of the user account that is logged-off is absent.

On the other hand, in a state where one of the user accounts is logged in, when a call or message is received by the user who is logged-off, the processor 120 may or may not notify of the call or message to a user who currently logged in according to the notification settings. That is, when the notification blocking is set, the processor 120 may transmit communication information on the communication event (call or message is received) to the personal contact of the user account that is logged-off, without notifying of the communication information to the user who currently logged in. The user monitoring service 420 may control the application 410 to be not displayed on the application screen and control the communication driver 450 to transmit the communication information.

In certain embodiments, background processing can include processing the communication event in a manner that is imperceptible to the user if the communication event is a reception event. Alternatively, when the notification permission is set, the processor 120 may notify of an arrival of the call or message to the user who is currently logged-in. Here, the notifying thereof may mean that the communication event is displayed. That is, in order to notify thereof to the user who is currently logged-in, the processor 120 may transmit the communication information on the communication event to a personal contact of the user account that is logged-off and at the same time display the communication event on the screen of the electronic device 101, cause the electronic device 101 to make an audible alert, or cause the electronic device 101 to vibrate.

According to various embodiments, when a communication event (reception of a call or message) has occurred from the counterpart electronic device having a telephone number included in both a telephone directory of the user account that is logged-in and a telephone directory of the user account that is logged-off, the processor 120 may display the communication event on the screen and at the same time transmit the communication information to the personal contact of the user account that is currently logged-in. In certain embodiments, when the communication event is displayed to a user who is currently logged in, the processor 120 may not transmit the communication information to the personal contact of the user account that is logged-off.

Figure 7A:
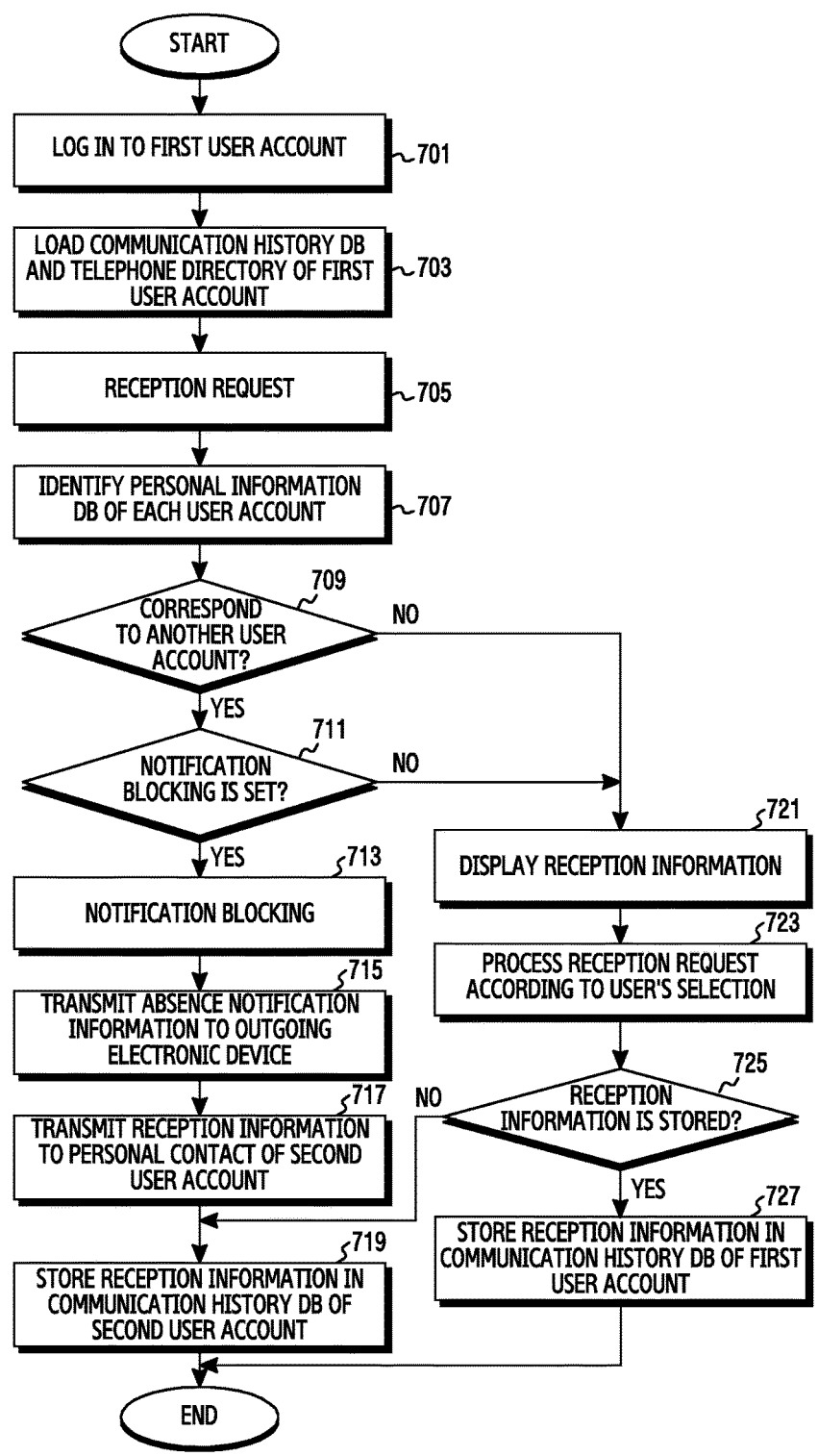
FIG. 7A is a flow chart illustrating an operation method of an electronic device when there is a reception request according to various embodiments.

FIG. 7A is a flow chart illustrating an operation method of an electronic device when there is a reception request according to various embodiments.

Referring to FIG. 7A, in operation 701, the processor 120 may allow a user to log into a first user account. For example, a first user may turn on the power supply of the electronic device 101 and enter the first user account, or enter the first user account onto the lock screen of the electronic device 101. When the user is logged into a first user account, the first user account that is logged-in can be registered on the user account management application 411. The user monitoring services 420 may determine which user account is currently logged-in by identifying a user account registered in the user account management application 411.

In operation 703, the processor 120 may load the communication history DB and telephone directory of the first user account. The processor 120 may load the communication history DB from the dialer 413 and message application 414. The communication history DB may include telephone history DBs 413a to 413z and message history DBs 414a to 414z. For example, the communication history DB of the first user account may include a telephone history DB 1 413a and message history DB 1 414a. The telephone directory of the first user account may be the personal information DB 1 431. When the first user account login is properly performed, the processor 120 may load only the communication history DB and telephone directory for the first user account. In this case, the first user of the first user account may view or edit only the first user's communication history DB and telephone directory, and may not access a communication history DB and telephone directory of another user account.

In operation 705, the processor 120 may receive a reception request. The reception request can be receiving an incoming call or message.

In operation 707, the processor 120 may check personal information for each user account. As described above, the personal information may include at least one of a telephone directory associated with each user account, notification setting information, personal contact or a user account of the cloud server 460. The user monitoring service 420 may check personal information associated with each user account stored in the personal information DB 430. Details of the method for identifying the personal information will be described later with reference to FIG. 7B.

In operation 709, the processor 120 may determine whether the counterpart's telephone number (outgoing call number) associated with the reception request corresponds to another user account. When the user is logged into the first user account, the another user account is logged-off.

The counterpart's telephone number corresponds to the another user account such as when the telephone number stored in the telephone directory of the another user account is the same as the counterpart's phone number. Alternatively, that the counterpart's telephone number corresponds to the another user account may mean that the telephone number stored in the communication history DB of the another user account is the same as the counterpart's phone number.

When the counterpart's telephone number corresponds to the another user account, the processor 120 may perform operation 711. When the counterpart's telephone number does not correspond to the another user account, the processor 120 may perform an operation 721.

First, when the counterpart's telephone number corresponds to the another user account, the processor 120 may determine whether the notification blocking is set to the another user account in operation 711. In a state where the another user account is logged-off and incoming calls or messages are received, the notification blocking setting indicates whether to notify of the received calls or messages to the user who is logged-in. For example, when the notification is set to 'blocked', the processor 120 may not notify the user who is currently logged-in. When the notification is set to 'permitted', the processor 120 may notify the user who is currently logged-in.

When the notification blocking is set, the processor 120 may perform operation 713, and when the notification blocking is not set, the processor 120 may perform an operation 721.

When the notification blocking is set, in operation 713, the processor 120 may block the notification of the reception request. For example, when the reception request is a call, the processor 120 may block the call. Call blocking may include the electronic device 101 not performing the corresponding operation when receiving an incoming call. For example, when receiving the incoming call, the electronic device 101 may output at least one of an alarm sound, vibration, remain silent according to settings, and the notification of the incoming call may be displayed on the display 160 of the electronic device 101. However, when the call is cut off, the electronic device 101 might not output the incoming call as the alarm sound or vibration and may not display the incoming call on the display 160 of the electronic device 101. In this case, a first user who is currently logged in to the electronic device 101 may not even know that an incoming call is received.

On the other hand, in a case where the reception request is a message, the processor 120 may block the notification of the message reception. In general, when receiving the message, the electronic device 101 may output at least one of an alarm sound, vibration, or remain silent, according to settings, and the notification of the message may be displayed on the display 160 of the electronic device 101. However, when the notification of the reception of the message is blocked, the electronic device 101 might not output the message reception as the alarm sound or vibration and might not display the message reception on the display 160 of the electronic device 101.

In operation 715, the processor 120 may transmit an absence notification message to the electronic device that originated the counterpart's phone number. The absence notification messages may indicate that the another user is logged off of the another user account. According to various embodiments, the processor 120 may determine whether to transmit the absence notification message according to the setting associated with the another user account. For example, the another user of the another user account may set the notification setting information referred to as absence notification message transmission to "all users". In this case, the processor 120 may transmit the absence notification message to all electronic devices regardless of the counterpart's phone number. On the other hand, the another user may set the notification setting information referred to as the absence notification message transmission to a "selected user", and select or set a telephone number for transmitting the absence notification message. In this case, when the counterpart's telephone number corresponds to the telephone number for transmitting the absence notification message, the processor 120 may transmit the absence notification message.

According to various embodiments, when the absence notification message is transmitted, the processor 120 may update the use authority information according to the administrator setting. For example, the processor 120 may decrement the number of messages, which is associated with the another user account, every time when the absence notification message is transmitted. On the other hand, even in a case where the absence notification message is transmitted, the processor 120 might not update the use authority information associated with the another user account.

At the time of transmitting the absence notification message, if the number of messages left, which are associated with the another user account, is zero, the processor 120 may adjust the number of messages of other user account. That is, the processor 120 may transmit the absence notification information by decrementing the number of messages of the first user account that is logged-in. At this time, the processor 120 may adjust the number of messages by acquiring the confirmation according to the setting of the first user account or without the confirmation. For example, the processor 120 may display a user interface on whether to reduce the number of messages of the first user account by one, and when only in the case of being permitted by the first user of the user interface, reduce the number of messages of the first user account by one, and transmit the absence notification message. On the other hand, the processor 120 may transmit the absence notification message by reducing the number of messages of the first user account by one without confirmation by the first user account.

On the other hand, the processor 120 may transmit the absence notification message by reducing the number of messages of a user account by one, in which the most numerous messages are left, among the user accounts that are logged-off. In this case, the processor 120 may transmit the absence notification message by acquiring the confirmation of the user account in which the most numerous messages are left, or by reducing the number of messages by one without confirmation.

In operation 717, the processor 120 may transmit the reception information to the personal contact of the another user account. The reception information may be associated with the reception request, and include at least one of the counterpart's phone number, reception date and time, and reception contents. According to various embodiments, the processor 120 may determine whether to transmit the reception information according to the setting associated with the another user account. For example, the another user may set the notification setting information to be configured to "always" transmit the reception information. In this case, the processor 120 may transmit the reception information to the personal contact of the another user account, regardless of the counterpart's phone number. On the other hand, the second user may set the notification setting information to be configured to transmit only reception information corresponding to the "selected phone number", and select and set a telephone number that should transmit the reception information. In this case, when the counterpart's telephone number corresponds to the set phone number, the processor 120 may transmit the reception information to the personal contact of the another user account.

According to various embodiments, when transmitting the reception information, the processor 120 may update the use authority information according to the administrator setting. For example, the processor 120 may reduce the number of messages associated with the another user account by one every time when the reception information is transmitted. On the other hand, in a case where the reception information is transmitted, the processor 120 may not update the use authority information associated with the another user account. When the number of messages left, which are associated with the another user account, is zero, the processor 120 may adjust the number of messages of other user account according to the administrator setting or user setting.

In operation 719, the processor 120 may store the reception information in a communication history DB of the another user. The processor 120 may temporarily store the reception information, and when a user is logged into the another user account, the processor 120 may store the reception information in the communication history DB of the another user. For example, if the reception information is a call, the processor 120 may store the reception information in the call history DB associated with the dialer 413. On the other hand, if the reception information is a message, the processor 120 may store the reception information in the message history DB associated with the message application 414.

Even when the counterpart's phone number, which is requested for reception, does not correspond to the another user account or corresponds to the another user account, the processor 120 may perform operation 721 when the notification blocking is not set to the another user account. The counterpart's telephone number does not correspond to the another user account means that the counterpart's telephone number matches with the telephone number stored in the personal information DB 1 431 of the first user account, or matches with the telephone number stored in the call history DB 1 413a or message history DB 1 414a. On the other hand, when a user account that matches with the counterpart's telephone number cannot be found, the processor 120 may perform the operation 721.

In operation 721, the processor 120 may display the reception information associated with the reception request. When the reception request is a call, at least one of the called counterpart's phone number, name, or image may be displayed. On the other hand, when the reception request is a message, at least one of the counterpart's phone number, which transmits the message, name, or content of the message may be displayed. That is, the reception information may be differently displayed depending on a notification display setting configured in the electronic device 101.

In operation 723, the processor 120 may process the reception request according to the selection of the first user of the first user account. For example, the first user may select a response or refusal on the user interface screen on which the reception information is displayed so as to select a method for processing the reception request and whether to process thereof. For example, when the reception request is a call, the first user may receive a call by selecting an "Answer" button or may not answer the call by selecting a "reject" button. When the "Answer" button is selected, the processor 120 may automatically execute the dialer 413. When the reception request is a message, the first user selects the "Confirm" button to confirm content of the message, or select the "Cancel" button so as not to confirm the content of the message. When the confirm button is selected, the processor 120 may automatically execute the message application 414.

According to various embodiments, the processor 120 may perform or not perform the operation 715 and operation 717 based on the result of processing the reception request or the settings of the another user account. When the first user who is currently logged-in responds to the reception request, the processor 120 may transmit the absence notification message to the electronic device from which the counterpart's telephone number is originated, and transmit the reception information to a personal contact of the another user account. On the other hand, only in a case where the first user who is currently logged-in refuses to the reception request, the processor 120 may transmit the absence notification message to the electronic device from which the counterpart's telephone number is originated, and transmit the reception information to a personal contact of the another user account. On the other hand, the processor 120 may perform the operation 715 and operation 717, regardless of the result of processing the reception request. That is, in both cases where the first user responds to or refuses to the reception request, the processor 120 may transmit the absence notification message to the electronic device from which the counterpart's telephone number is originated, and transmit the reception information to a personal contact of the another user account.

According to various embodiments, in operation 723, only in the case where the first user responds to the reception request, the processor 120 may display a user interface screen on which the user selects whether to store the reception information. That is, when the reception request is rejected in operation 723, the processor 120 may determine that the first user does not want to store the reception information and perform the operation 719 without performing an operation 725.

In operation 725, the processor 120 may receive, from the first user, a selection of whether to store the reception information. After processing the reception request, the processor 120 may receive, from the first user, a selection of whether to store the reception request. For example, regardless of the response to or refusal of the reception request, the processor 120 may receive, from the first user, a selection of whether to store the reception information. When the "Answer" button is pressed in the operation 723, the processor 120 may display a user interface screen on which the selection of whether to store the reception information after terminating the call is input. On the other hand, when the refusal button is pressed in the operation 723, the processor 120 may display a user interface screen on which the selection of whether to store the reception information is input.

When the "store reception information" is selected, in operation 727, the processor 120 may store the reception information in the communication history DB of the first user account. For example, the processor 120 may store the reception information in the call history DB 1 413a or message history DB 1 414a. In this case, the processor 120 may store the reception information in the communication history DB of the another user account.

When the "Do not store reception information" is selected, in operation 719, the processor 120 may store the reception information in the communication history DB of the another user account. In this case, the processor 120 may store the reception information only in the communication history DB of the another user account without storing the reception information in the communication history DB of the first user account.

Figure 7B:
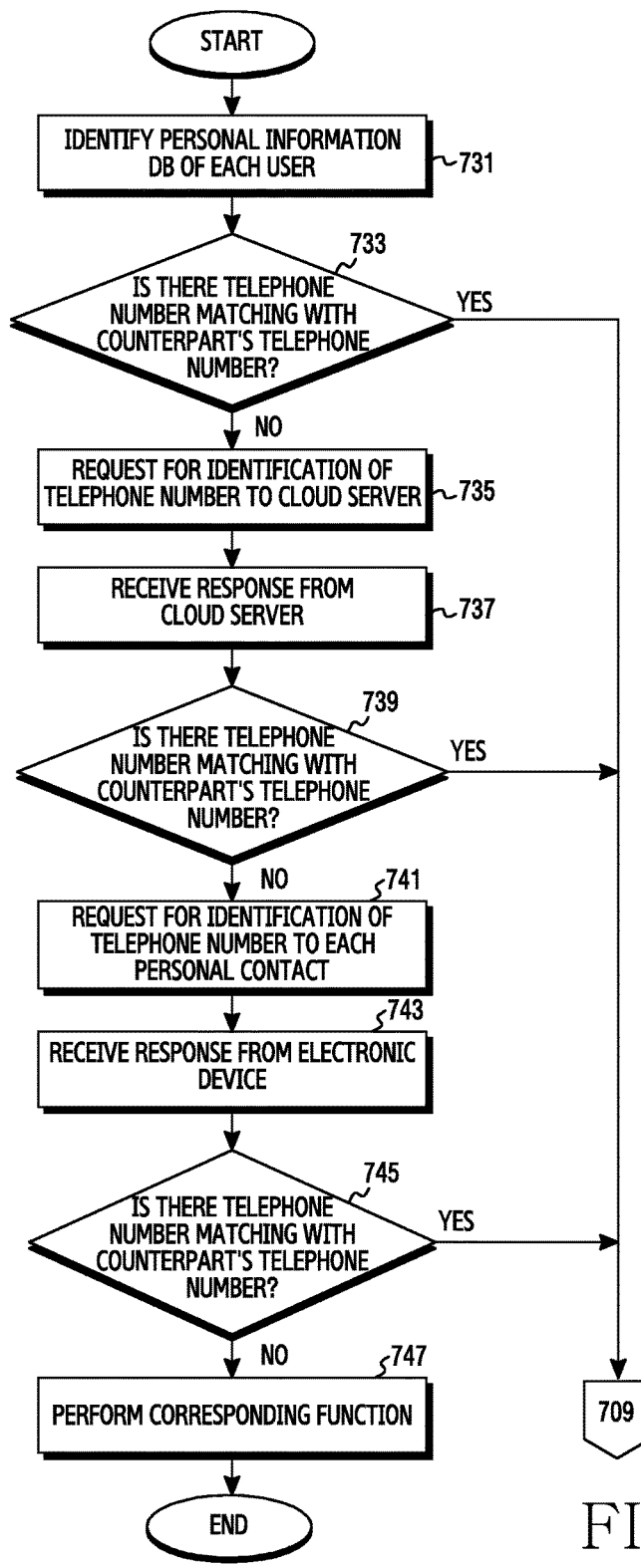
FIG. 7B is a flow chart illustrating a method for identifying personal information of each user account according to various embodiments.

FIG. 7B is a flow chart illustrating a method for identifying personal information of each user account according to various embodiments. FIG. 7B illustrates the operation 707 of FIG. 7A in detail.

Referring to FIG. 7B, in operation 731, the processor 120 may identify personal information of each user account from the memory 130.

In operation 733, the processor 120 makes a determination of whether a telephone number matching the counterpart's telephone number corresponding to the communication event is stored in the telephone directory of the personal information. When a matching telephone number is stored in the memory 130, the processor 120 may identify the user account having the telephone number stored therein.

When the matching telephone number is stored in the memory 130 during operation 733, the processor 120 may perform the operation 709 of FIG. 7A. When the matching telephone number is not stored in the memory 130 during operation 733, the processor 120 may perform the operation 735.

In operation 735, the processor 120 may make a request for identifying a telephone number to the cloud server 460. For example, the processor 120 may make a request for identifying the counterpart's telephone number corresponding to the communication event to the cloud server 460. The cloud server 460 may receive the request and determine whether there is a telephone number that matches the counterpart's phone number, from among phone numbers stored in the database. The cloud server 460 may transmit the result of the determination as a response to the request.

In operation 737, the processor 120 may receive the response from the cloud server 460.

In operation 739, the processor 120 may determine whether a telephone number is stored that matches with the counterpart's telephone number corresponding to the communication event, based on the received response. For example, when a matching telephone number is stored in the cloud server 460, the processor 120 may receive, as the response, a user account in which the counterpart's telephone number is registered. When a user account is received as the response, the processor 120 may determine that there is a matching telephone number stored in the cloud server 460. At this time, one or more user accounts may be received.

On the other hand, when a matching telephone number is not stored in the cloud server 460, the processor 120 may receive "No User Accounts" as the response. When a user account is not received as the response, the processor 120 may determine that a matching telephone number is not stored in the cloud server 460. Alternatively, the processor 120 may receive, as the response, a user account along with the result of confirmation (for example, stored (for example, positive, yes, OK, confirm), or not stored (for example, negative, No, not OK, reject)). The processor 120 may determine whether a phone number that matches the counterpart's telephone number corresponding to the communication event is stored, based on the result of confirmation included in the response.

When a matching telephone number is stored in the cloud server 460 (the result of condition 739 is YES), the processor 120 may perform the operation 709 of FIG. 7A, and when the matching telephone number is not stored (condition 739 is NO) in the cloud server 460, the processor 120 may perform an operation 741.

In operation 741, the processor 120 may make a request for confirmation of the telephone numbers to the electronic devices of personal contacts (for example, personal devices 470, 480, 490). For example, the processor 120 may make a request for identifying the counterpart's telephone number corresponding to the communication event to the personal devices 470, 480, 490.

In operation 743, the processor 120 may receive the response from the personal devices 470, 480, 490.

In operation 745, the processor 120 may determine whether a telephone number is stored that matches with the counterpart's telephone number corresponding to the communication event, based on the received response. For example, the processor 120 may receive, as the response, the result of confirmation (for example, stored (for example, positive, yes, OK, Confirm), or not stored (for example, negative, No, not OK, reject)), from the personal devices 470, 480, 490. When the result of confirmation received from at least one of the personal devices 470, 480, 490 is "stored", the processor may identify a user account of a personal device from which "stored" is transmitted.

When a telephone number that matches at least one of the personal devices 470, 480, 490 is stored (condition 745 is YES), the processor 120 may perform the operation 709 of FIG. 7A. When no telephone number that matches at least one of the personal devices 470, 480, 490 is stored (condition 745 is NO), the processor 120 may perform the operation 747.

In operation 747, the processor 120 may perform the corresponding function. For example, the processor 120 may display the reception information corresponding to the communication event. That is, when the telephone number that matches at least one of the personal devices 470, 480, 490 is not stored, the processor 120 perform the operation 721 of FIG. 7A.

According to various embodiments, the processor 120 may simultaneously request the cloud server 460 and the personal devices 470, 480, 490 to identify the telephone number corresponding to a communication event. On the other hand, the processor 120 may perform operations 741 to 745, and then perform operations 735 to 739 according to the result of the operation 745. On the other hand, the processor 120 may set a priority to the cloud server 460 and the personal devices 470, 480, 490, and successively request one of the cloud server 460 or personal devices 470, 480, 490 to identify the telephone number corresponding to a communication event on the basis of the set priority. The processor 120 may request one of the cloud server 460 or the personal devices 470, 480, 490, which do not make a request for identification, to identify the telephone number corresponding to a communication event on the basis of a response to the request.

Figure 8:
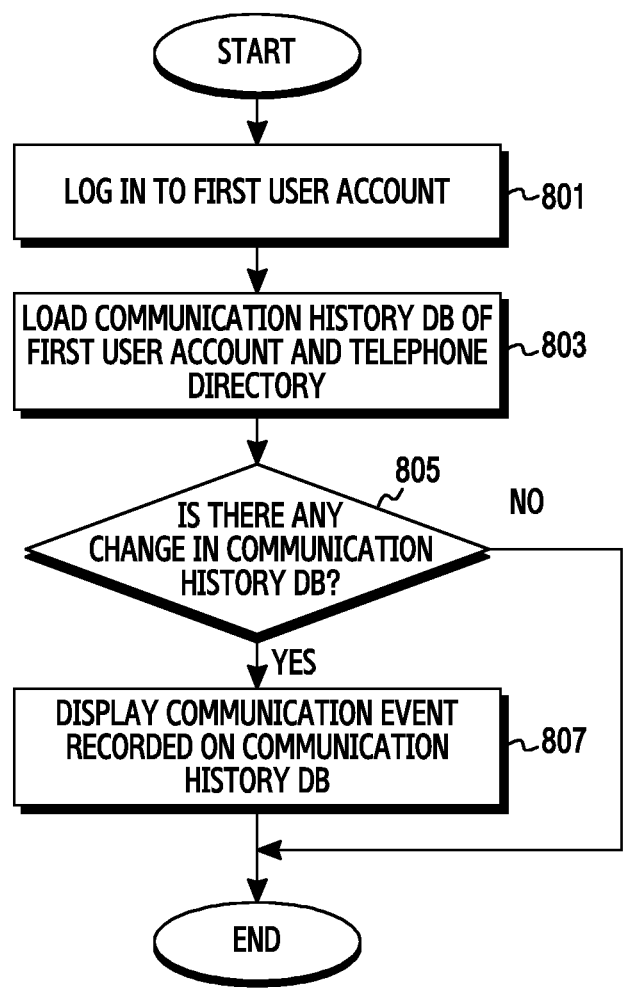
FIG. 8 is a flow chart illustrating an operation method of an electronic device when a user is logged-in according to various embodiments.

FIG. 8 is a flow chart illustrating an operation method of an electronic device when a user is logged-in according to various embodiments.

Referring to FIG. 8, in operation 801, the processor 120 may allow a user to log into a first user account. For example, a first user may turn on the power supply of the electronic device 101 and input the first user account or input the first user account onto the lock screen of the electronic device 101.

In operation 803, the processor 120 may load the communication history DB and telephone directory of the first user account. The processor 120 may load the communication history DB from the dialer 413 and message application 414. The communication history DB may include telephone history DBs 413a to 413z and message history DBs 414a to 414z.

In operation 805, the processor 120 may determine whether the loaded communication history DB is changed. For example, when a communication event associated with the first user account has occurred when the first user account is logged-off, the communication history DB may be changed. The communication event is for the reception information. That is, when an incoming call or message is received to the first user account when the first user account is logged-off, there may be a change in the communication history DB.

Thus, the processor 120 may perform operation 807 when there is a change in the loaded communication history DB, and may bypass operation 807, thereby ending the process, when there is no change in the loaded communication history DB. When completed, after the operation 805, the processor 120 may perform at least one of the operation 601 of FIG. 6, the operation 705 of FIG. 7, an operation 901 of FIG. 9, an operation 1005 of FIG. 10, or an operation 1101 of FIG. 11.

According to various embodiments, when requesting the electronic device of each personal contact (for example, personal devices 470, 480, 490) to identify a telephone number corresponding to a communication event, the processor 120 might not record information on the communication event in the communication history DB. On the other hand, when requesting the electronic device of each personal contact (for example, personal devices 470, 480, 490) to identify a telephone number corresponding to a communication event, the processor 120 may record the information on the communication event in the communication history DB.

In operation 807, the processor 120 may display information on the communication event recorded in the communication history DB. The information on the communication event is for the reception information. For example, if the reception information is a call, the processor 120 may display the reception information to a missed call list. When the first user has selected one piece of the reception information, the processor 120 may display at least one of a counterpart's telephone number, a call date and time or an image. When the reception information is a message, the processor 120 may display the reception information in a list of messages. When the first user has selected one piece of the reception information, the processor 120 may display at least one of a counterpart's telephone number, a date and time at which the message is sent or a content of the message.

Figure 9:
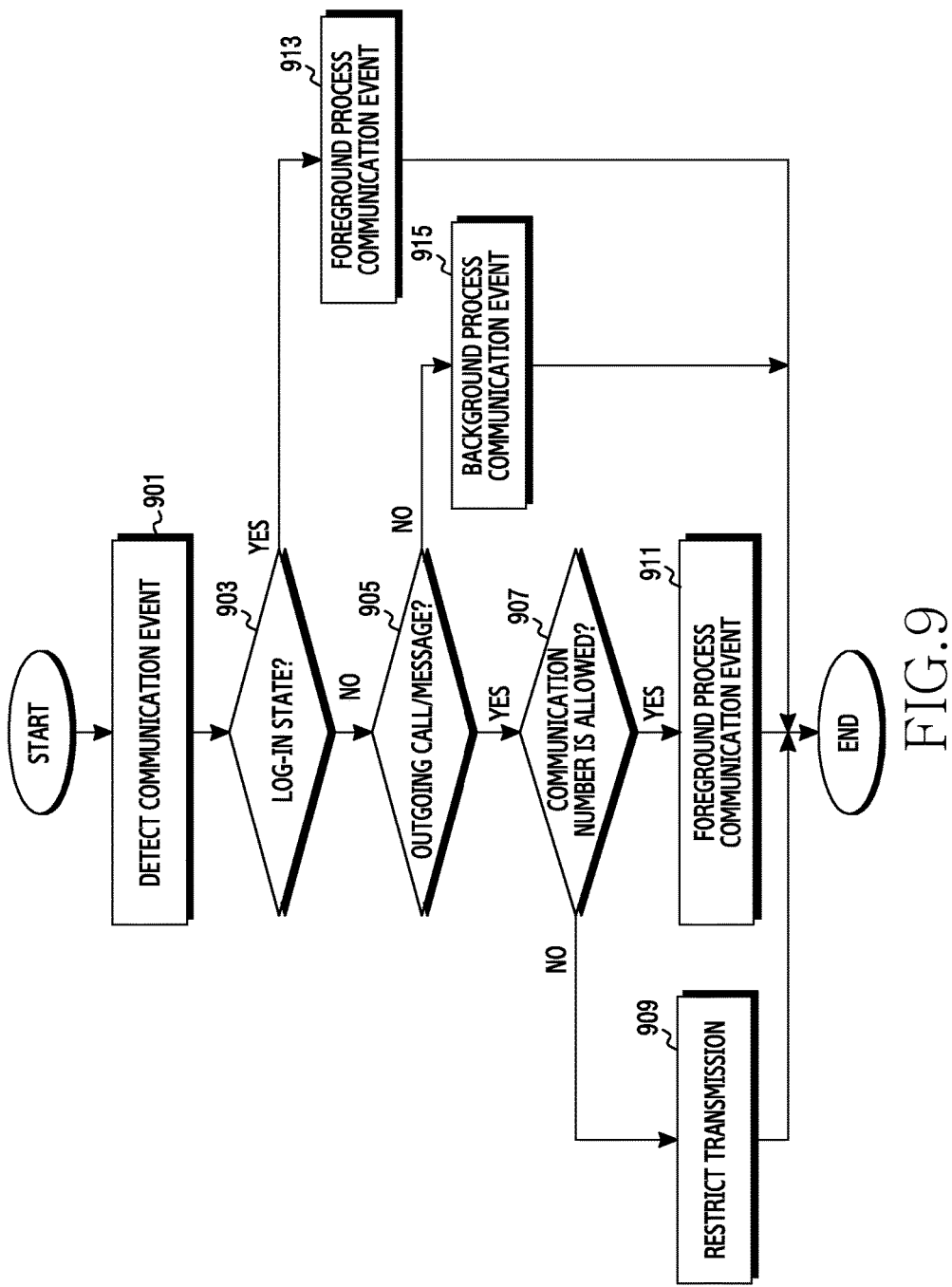
FIG. 9 is a flow chart illustrating a method for processing a communication event in a logged-off state according to various embodiments.

FIG. 9 is a flow chart illustrating a method for processing a communication event in a logged-off state according to various embodiments.

Referring to FIG. 9, in operation 901, the processor 120 may detect a communication event. For example, the communication event for the call may include a reception request for the incoming call from the counterpart electronic device, and an outgoing call request for selecting an "answer" button on the user interface of the dialer 413 by the user. The communication event for the message may include a reception request for receiving the message from the counterpart electronic device and a transmission request for selecting "make call" button, by the user, on the user interface of the message application 414. The communication event of the data may be for selecting and executing an application for data communication by the user.

In operation 903, the processor 120 may determine whether the user is logged-in state. The user monitoring services 420 may determine the user is currently logged-in to which user account by identifying the user account management application 411.

The processor 120 may perform an operation 913 in a logged-in state (condition 903 is YES), and may perform an operation 905 in a logged-off state (condition 903 is NO).

In the log-off state, in operation 905, the processor 120 may determine whether the communication event is a transmission, such as an outgoing phone call, or an outgoing text message. In operation 905 that all user accounts may be in the logged-off state and no one is logged-in.

The processor 120 may perform the operation 907 when the communication event is a transmission, and perform an operation 915 when the communication event is a reception.

When the communication event is a transmission, in the operation 905, the processor 120 may determine whether the telephone number of the communication event (for example, a communication number) is an allowed telephone number, or destination in operation 907. According to various embodiments, when all users are in the logged-off state, the processor 120 may allow an outgoing call of limited telephone numbers. For example, in the state where all users are logged-off, the processor 120 may allow an outgoing call of an emergency call (for example, 119, 112, etc.) or to only one telephone number set for each user account.

When the telephone number, or destination is allowed for the communication, the processor 120 may perform an operation 911, and when the telephone number is not allowed, the processor 120 may perform an operation 909.

When the telephone number for the communication is not allowed, in operation 907, the processor 120 may restrict the requested outgoing transmission in operation 909. That is, the user monitoring service 420 may control the communication driver 450 so as to prevent the outgoing call or text.

When the telephone number for the communication is allowed, in operation 907, the processor 120 may foreground process the communication event in operation 911. For example, the processor 120 may allow the outgoing call and display information on the outgoing call on the user interface.

When the communication event is an incoming reception, in operation 915, the processor 120 may background process the communication event. The processor 120 may block the communication event and might not display the communication event. That is, the processor 120 may perform operations 713 to 719 of FIG. 7.

When at least one user account is in a logged-in state, in operation 903, the processor 120 may foreground process the detected communication event (operation 913). For example, the processor 120 may allow the communication event and display communication information on the communication event on the user interface. That is, the processor 120 may perform operations 721 to 727 of FIG. 7.

Figure 10:
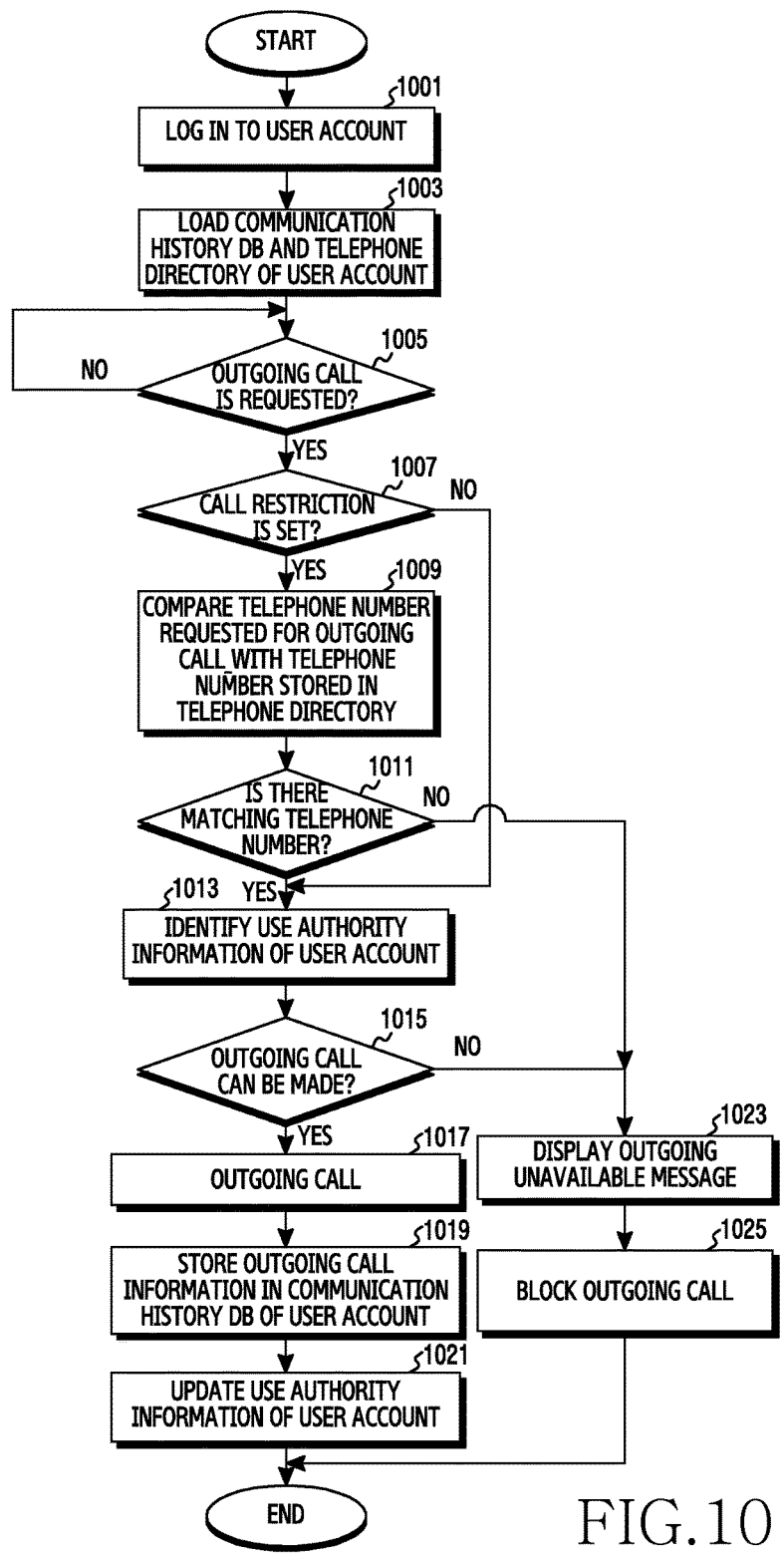
FIG. 10 is a flow chart illustrating an operation method of an electronic device when there is an outgoing call request according to various embodiments.

FIG. 10 is a flow chart illustrating an operation method of an electronic device when there is an outgoing call request according to various embodiments.

Referring to FIG. 10, in operation 1001, the processor 120 may allow a user to log into a user account. For example, a first user may turn on the power supply of the electronic device 101 and input the user account, or input the user account onto the lock screen of the electronic device 101.

In operation 1003, the processor 120 may load the communication history DB and telephone directory of the user account. The processor 120 may load the communication history DB from the dialer 413 and message application 414 and load the telephone directory from the personal information DB 430. That is, the processor 120 may load only the communication history DB and telephone directory for the user account that is logged-in, and not load the communication history DB and telephone directory for the other user account that is logged-off.

In operation 1005, the processor 120 may determine whether there is an outgoing call request from the user. For example, the outgoing call request may be selecting, by the user selecting a "call" button on the user interface of the dialer 413, or selecting a "transmission" button on the user interface of the message application 414, or may be determined by whether the data application 412 is executed.

The processor 120 may wait until there is an outgoing call request (when operation 1005 is NO) and perform an operation 1007 when there is an outgoing call request.

When there is an outgoing call request, in operation 1007, the processor 120 may determine whether there is a call restriction. The call restriction may be configured to enable calling to only telephone numbers stored in the telephone directory. That is, the user who is logged-in may originate the call to the telephone numbers stored in his telephone directory. The user monitoring service 420 may determine whether the call restriction information is set to the use authority information associated with the user account that is logged-in by checking the use authority information DB 440. The use authority information may include at least one of a use authority according to the communication type, the use amount according to the communication type, or call restriction information.

When the call restriction is set (Condition 1007 is YES), the processor 120 may perform an operation 1009, and when the restriction is not set (Condition 1007 is NO), the processor 120 may perform an operation 1013.

In operation 1009, when the call restriction is set, the processor 120 may compare the telephone number requested for an outgoing call with a telephone number stored in the telephone directory of the user who is logged-in.

In operation 1011, the processor 120 may determine whether there is a matching telephone number.

When there is a matching telephone number (Condition 1011 is YES), the processor 120 may perform an operation 1013, and when there is no matching telephone number, (Condition 1011 is NO) the processor may perform an operation 1023.

When there is a matching telephone number or the call restriction is not set, in operation 1013 the processor 120 may identify the use authority information of the user account. The processor 120 may identify the use amount according to the use authority or the communication type according to the communication type, within the use authority information.

In operation 1015, the processor 120 may check the use authority for a communication type to which the transmission is requested or the use amount according to the communication type so as to determine whether an outgoing call can be made. For example, the use amount of the user account is 30 minutes of voice calls, 50 messages, and 1 G byte data. However, the use amount includes no voice calls, three messages, and no data remaining. In this case, when the call request is call or data communication, the outgoing call is not available, and when the call request is a message, the outgoing call is available.

The processor 120 may perform an operation 1017 when the outgoing call is available, and the processor 120 may perform an operation 1023 when the outgoing call is not possible.

When the outgoing call is possible, in operation 1017, the processor 120 may process the outgoing call. The call processing may allow an outgoing call, the transmission of a message, or the execution of the data application.

In operation 1019, the processor 120 may store the outgoing call information in the communication history DB of the user account. When an outgoing call is originated, the processor 120 may store the outgoing call information (for example, a counterpart's telephone number and outgoing call date and time, etc.), after terminating the call, in the calling list of the telephone history DB of the user account in the dialer 413. When a message is originated, the processor 120 may store the outgoing message information (for example, a counterpart's telephone number and date and time at which the message is transmitted, and a content of the message, etc.), after transmitting the message, in the message transmission list of the message history DB of the user account in the message application 414. When data communication is originated, the processor 120 may store the outgoing data information (for example, access page, access date and time, etc.) in an access history DB of the user account in the data application 412, after completing the data communication.

In operation 1021, the processor 120 may update the use authority information of the user account. For example, when the remaining use amount of the user account is 10 minutes of voice calls, 10 messages, and 500 Kb of data, the processor 120 may update the use authority information of the user account according to the use amount of calling, after completing the calling. For example, when a call is made for "5 minutes", the processor 120 may update a voice call use amount of the user account to 5 minutes. When one message is used, the processor 120 may update to the number of messages of the user account to nine messages. For reference, when one short message is transmitted, one message is subtracted, and when one multimedia message is transmitted, three messages may be subtracted. On the other hand, the processor 120 may limit the multimedia message to be transmitted according to the settings of the electronic device 101 or an administrator setting or, the use amounts of the short message and the multimedia message may be set, respectively. When data communication of "300 Kb" is used, the processor 120 may update the data use amount of the user account to 200 Kb.

When there is no matching telephone number or the outgoing call cannot be made (Condition 1015 is NO) in operation 1023, the processor 120 may display a message indicating the outgoing call is not available. The outgoing call unavailable message may be displayed on the user interface in the form of pop-up window. The outgoing unavailable message may include contents such as "cannot be transmitted", "Outgoing call cannot be made", or "Contact your administrator." Therefore, the user may know that the calling cannot be made through the outgoing unavailable message.

In operation 1025, the processor 120 may block the requested outgoing call.

Figure 11:
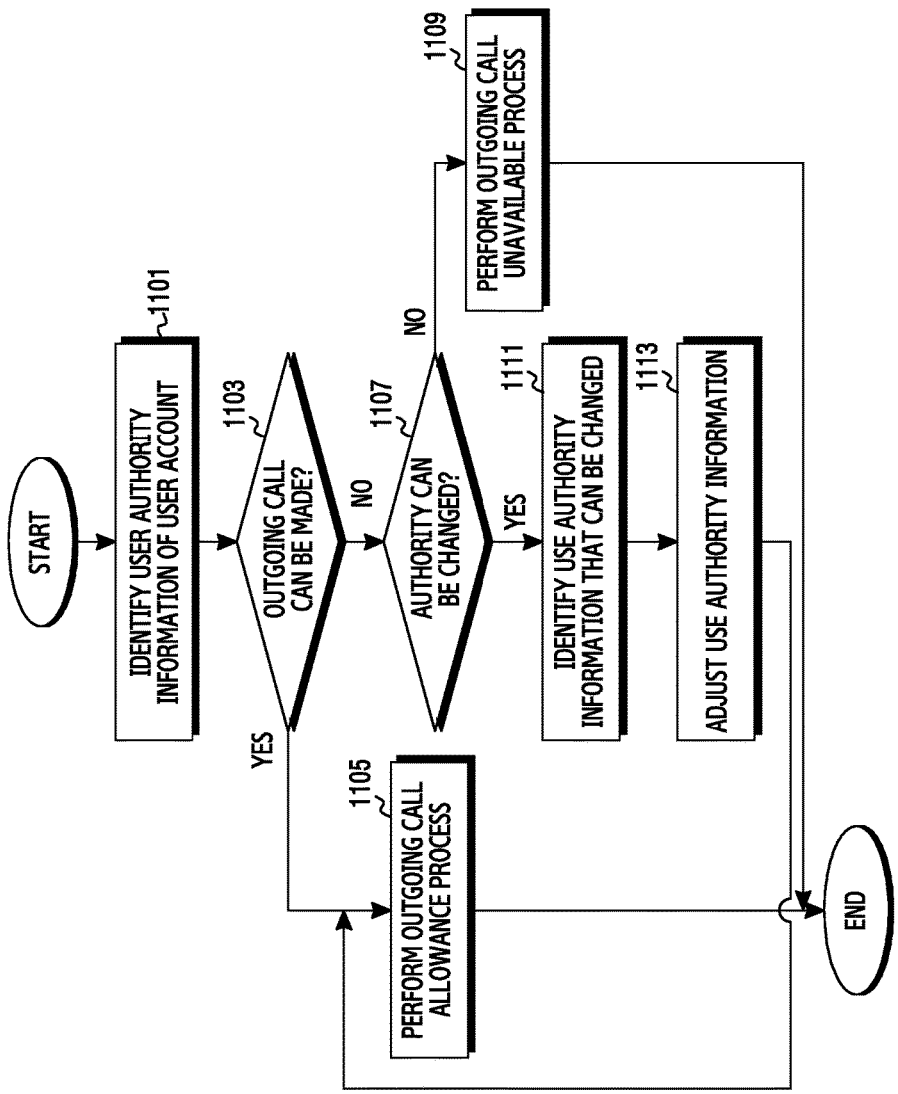
FIG. 11 is a flow chart illustrating another operation method of an electronic device when there is an outgoing call request according to various embodiments.

FIG. 11 is a flow chart illustrating another operation method of an electronic device when there is an outgoing call request according to various embodiments.

Referring to 11, in operation 1101, the processor 120 may identify the user authority information of a user account that is logged-in. The operation 1101 may be the same as or similar to the operation 1013 of FIG. 10. The processor 120 may identify the use amount according to the use authority or the communication type according to the communication type, within the use authority information.

In operation 1103, the processor 120 may determine whether an outgoing call can be made. Determining whether an outgoing call can be made can include identifying the user authority for phone calls, or the usage amount permitted for the user account. The operation 1103 may be the same as or similar to the operation 1015 of FIG. 10.

The processor 120 may perform an operation 1105 when is determined during operation 1103 that the calling can be made. The processor 120 may perform an operation 1107 when the calling cannot be made. In operation 1105, the processor 120 may perform a process for allowing the outgoing call. The outgoing call allowing process may include an operation of outgoing call, storing the call information in the communication history DB of the user account, and updating the use authority information of the user account. That is, the outgoing call allowance process may be for performing operations 1017 to 1021 of FIG. 10.

When the calling is not available, in operation 1107 the processor 120 may determine whether the use authority information can be changed. The change of the use authority information may include whether the outgoing call is possible to a user account that is logged-off, when the outgoing call can be made because the use amount of the user account that is logged-off is leftover. On the other hand, the change of the use authority information can include whether the outgoing call can be made using a following month's use amount of the user account that is logged-in. The change of use authority information can be made according to the administrator setting or each user account setting.

The processor 120 may perform operation 1111 when the change of the use authority information can be made, and may perform operation 1109 when the use authority information cannot be changed. In operation 1109, the processor 120 may perform an outgoing call unavailable process. The outgoing call unavailable process may include an operation of displaying the outgoing unavailable message and blocking the outgoing call. That is, the outgoing call unavailable process may be for performing operations 1023 and 1025 of FIG. 10.

When the use authority information can be changed, in operation 1111, the processor 120 may identify the use authority information that can be changed. The processor 120 may identify the use authority information which can be changed on the basis of the administrator setting or setting of each user account. For example, the processor 120 may determine the use authority information of a user account having the largest use amounts among the user accounts that are logged-off, as the use authority information which can be changed. On the other hand, the processor 120 may determine the use authority information of a user account configured to "usable" among the user accounts that are logged-off, as the use authority information which can be changed. On the other hand, the processor 120 may determine whether the following month's use amount of the user account that is logged-in is available.

In operation 1113, the processor 120 may adjust the use authority information. That is, the processor 120 may subtract a use amount from the use authority information which can be changed, and increase or decrease, by the subtracted use amount, the use amount of the user account that is logged-in. When the adjustment of the use authority information is completed, the processor 120 may perform the operation 1105. That is, since the calling to the user account that is logged-in can be made by adjusting the use authority information, the processor 120 may perform the outgoing call allowance process.

Figure 12A:
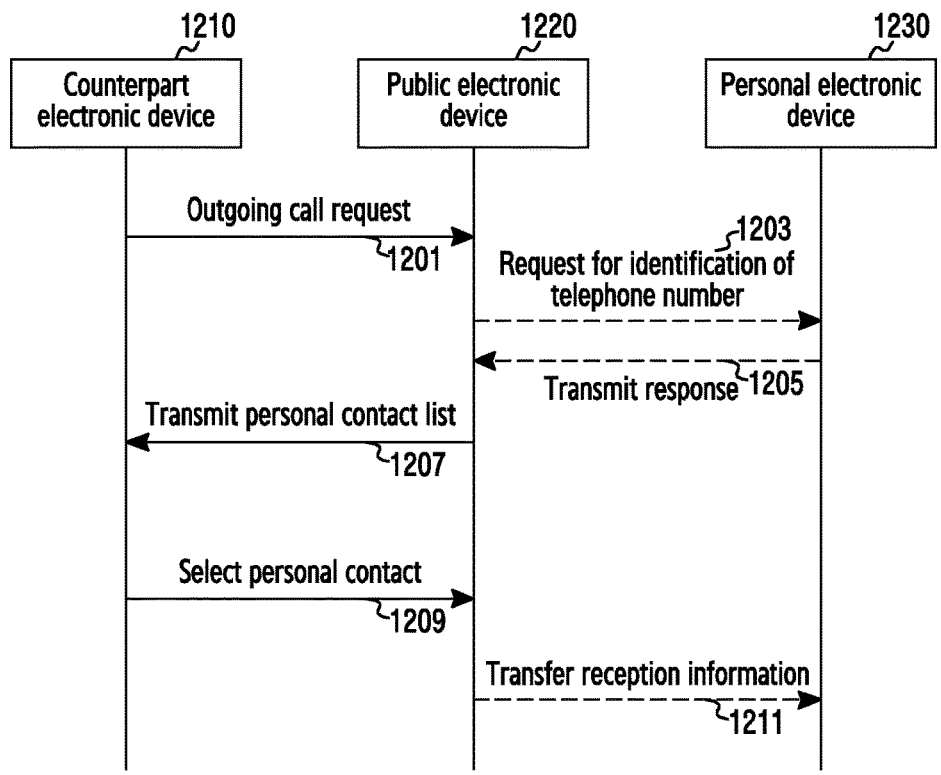
FIG. 12A and FIG. 12B are flow charts illustrating a method for transferring a list of personal contacts to a counterpart electronic device according to various embodiments.
Figure 12B:
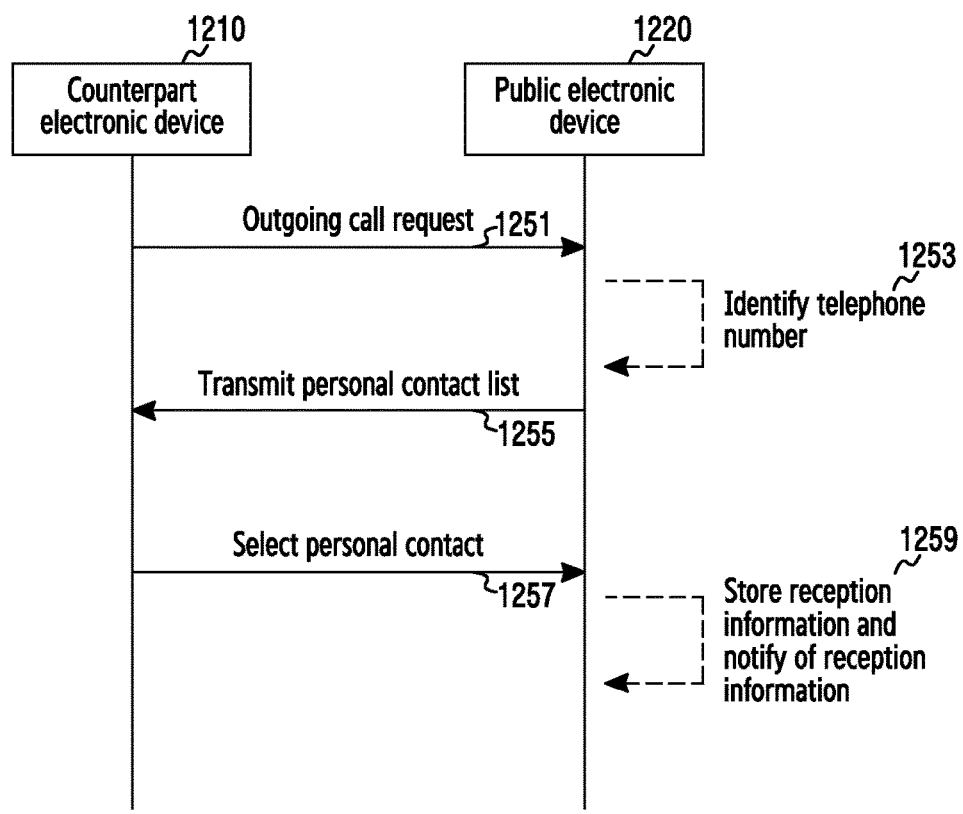

FIG. 12A and FIG. 12B are signal flow diagrams illustrating a method for transferring a list of personal contacts to a counterpart electronic device according to various embodiments.

Referring to FIG. 12A, in operation 1201, the counterpart electronic device 1210 may request for an outgoing call to a public electronic device 1220. The public electronic device 1220 may be an electronic device shared by using a plurality of user accounts, and correspond to the electronic device described with reference to FIGS. 1 to 11. The outgoing call request may be for a call or message transmission.

In operation 1203, the public electronic device 1220 may receive the outgoing call request and request the personal electronic device 1230 to identify a contact associated with the telephone number of the counterpart electronic device 1210. The personal electronic device 1230 may be an electronic device, which corresponds to a personal contact of a user account stored in the public electronic device 1220. For example, the personal electronic device 1230 may be at least one of the personal devices 470, 480, 490 described in FIG. 4C. When a telephone number corresponding to the telephone number of the counterpart electronic devices 1210 is not detected from the memory (for example, the memory 130), the public electronic device 1220 may make a request for the identification of a telephone number of the counterpart electronic devices 1210 to the personal electronic device 1230.

On the other hand, although not shown, the public electronic device 1220 may make a request for identifying a contact associated with the telephone number of the counterpart electronic device 1210 to the cloud server 460. On the other hand, when a telephone number corresponding to the telephone number of the counterpart electronic device 1210 is not detected from the memory, and a telephone number corresponding to the telephone number of the counterpart electronic device 1210 is not detected from the cloud server 460, the public electronic device 1220 may make a request for the identification of a telephone number of the counterpart electronic device 1210 to the personal electronic device 1230.

For reference, in drawings, a single personal electronic device 1230 is shown, but one or more personal electronic devices 1230 can be used. For example, when the number of personal contacts of a user account stored in the public electronic device 1220 is four, four personal electronic devices 1230 may be provided. The public electronic device 1220 may request for the identification of a telephone number of the counterpart electronic devices 1210 to all electronic devices corresponding to personal contacts of a user account.

In operation 1205, the personal electronic device 1230 may transmit a response to the identification request to the public electronic device 1220. The response may include an identification result that a telephone number of the counterpart electronic devices 1210 is stored or not. As the identification result, when the telephone number of the counterpart's electronic device 1210 is stored, the personal electronic device 1230 may transmit the response. On the other hand, as the identification result, when the telephone number of the counterpart's electronic device 1210 is not stored, the personal electronic device 1230 may not transmit the response.

In operation 1207, the public electronic device 1220 may receive the response, and transmit, to the personal electronic device 1230, a list of personal contacts based on the response. The personal contact list may include personal contacts (for example, a user name, telephone number or e-mail address) of the personal electronic device 1230 which has responded that the telephone number of the counterpart electronic device 1210 is stored therein. The personal contact list may include a single personal contact or one or more personal contacts. The public electronic device 1220 may search for the telephone number of the personal electronic device 1230 from a user account stored in the memory, and generate the personal contact list including the searched telephone number. On the other hand, the public electronic device 1220 may identify the calling number which has responded that the telephone number of the counterpart electronic device 1210 is stored, and generate a personal contact list including the calling number.

According to various embodiments, when the response is not received within a predetermined time, the public electronic device 1220 may determine that the telephone number of the counterpart electronic device 1210 is not stored with respect to the personal electronic device 1230 from which the response is not sent.

According to various embodiments, the public electronic device 1220 may generate the personal contact list based on the response received from the cloud server 460. That is, the public electronic device 1220 may generate the personal contact list based on the response of the personal electronic device 1230 (for example, stored, not stored), and the response of the cloud server 460 (for example, stored, not stored), According to various embodiments, the public electronic device 1220 may determine the display sequence of the telephone numbers when one or more personal contacts are included in the personal contact list. For example, the public electronic device 1220 may determine the display sequence of the personal contacts based on the communication history DBs (for example, call history DBs 413*a* to 413*z*) and message history DBs 414*a* to 414*z*). The public electronic device 1220 may determine the display sequence of the personal contact based on the communication number of times or the latest communication history.

For example, the public electronic device 1220 may generate the personal contact list by sorting the personal contacts in ascending or descending order according to the communication number of times. That is, the public electronic device 1220 may determine a display sequence such that a personal contact having the largest communication number of times is displayed first. On the other hand, the public electronic device 1220 may generate the personal contact list by sorting the personal contacts in ascending or descending order according to the latest communication history. That is, the public electronic device 1220 may determine a display sequence such that a personal contact having the latest communication history is displayed first. In addition, the public electronic device 1220 may determine the display sequence of the personal contacts when one or more personal contacts are included in the personal contact list in various methods.

According to various embodiments, the public electronic device 1220 may control the full or a part of a personal contact to be included in the personal contact list. For example, the public electronic device 1220 may include the full telephone number (for example, 010-1234-5678) of the personal contact in the personal contact list. On the other hand, the public electronic device 1220 may include a part of the telephone number (for example, 010-1234-**, 010--5678) of the personal contact in the personal contact list. This may be different according to the user setting of the user account, the setting of the public electronic device 1220, or the setting (or request) of the personal electronic device 1230**.

For example, some users may not wish their personal contacts to be exposed to the counterpart. These users may be set to "Do not allow". In this case, the public electronic device 1220 may generate the personal contact list to be seen a part of the telephone number (for example, 010-1234-**, 010--5678) of the personal contact. On the other hand, the user may allow the exposure of personal contacts to only some limited counterparts. These users may be set to "allow some". In this case, the public electronic device 1220 may determine whether the counterpart's telephone number is an allowed telephone number, and when it is the allowed phone number, the public electronic device 1220 may generate the personal contact list such that the full telephone number of the personal contact is to be seen. On the other hand, when the counterpart's telephone number is a not-allowed telephone number, the public electronic device 1220** may generate the personal contact list such that a part of the telephone number of the personal contact is to be seen.

On the other hand, the user may allow personal contacts of all incoming calls from the counterpart are to be exposed. These users may set the personal contacts to "allow all". When creating a user account in the public electronic device 1220, the user may set whether to allow the personal contacts to be exposed. On the other hand, when transmitting a response from the personal electronic device 1230, the user may include whether to allow the personal contacts to be exposed according to information set in the personal electronic device 1230. That is, the public electronic device 1220 may control the full or a part of the personal contacts to be included in the personal contact list, based on the user setting of a user account, the setting of the public electronic device 1220, or the request of the personal electronic device 1230.

In operation 1209, the counterpart electronic device 1210 may receive the personal contact list, and select at least one personal contact from the personal contact list. One or more telephone numbers are included in the personal contact list means that one or more user accounts store the counterpart's telephone number. In this case, since it is not clear to which user account the outgoing call is requested by the counterpart, the counterpart himself (for example, the user of the counterpart electronic device 1210) may select a user account to which the outgoing call request will be made. One personal contact may be selected or one or more personal contacts may be selected.

In operation 1211, the public electronic device 1220 may receive a personal electronic device of the selected personal contact, and transfer the reception information to the selected personal electronic device 1230. The reception information may include at least one of telephone numbers of the counterpart electronic device 1210 to which the outgoing request is made, the outgoing call request data and time, or a communication type (for example, call, messages). In addition, the public electronic device 1220 may store the reception information in the communication history DB.

Referring to FIG. 12B, in operation 1251, the counterpart electronic device 1210 may request the outgoing call to the public electronic device 1220. The operation 1251 may be the same as or similar to the operation 1201 of FIG. 12A. Therefore, detailed description thereof will be omitted.

In operation 1253, the public electronic device 1220 may identify a contact associated with the telephone number of the counterpart electronic device 1210. For example, a public electronic device 1220 may identify whether a telephone number corresponding to the telephone number of the counterpart electronic device 1210 is stored in a memory (for example, memory 130). When the telephone number corresponding to the telephone number of the counterpart electronic device 1210 is stored in the memory, the public electronic device 1220 may generate a private contact list including personal contacts of a user account having the telephone number stored therein. When the telephone number corresponding to the telephone number of the counterpart electronic device 1210 is not stored in the memory, the public electronic device 1220 may make a request for identifying a telephone number of the counterpart electronic device 1210 to the cloud server 460 or the personal electronic device 1230. The public electronic device 1220 may transmit the identification request to at least one of the cloud server 460 or the personal electronic device 1230 based on the priority, and transmit the identification request, based on a response to the request, to at least one of the cloud server 460 or the personal electronic device 1230 from which the identification request is not sent. On the other hand, the public electronic device 1220 may make a request for identifying a telephone number of the counterpart electronic device 1210 to the cloud server 460 and the personal electronic device 1230 at the same time. The public electronic device 1220 may generate the personal contact list on the basis of the responses received from the cloud server 460 or personal electronic device 1230 for the request. The public electronic device 1220 may identify a user account which has responded that the telephone number is stored, and include the telephone number of the user account in the personal contact list.

In operation 1255, the public electronic device 1220 may transmit the personal contact list to the counterpart electronic device 1210. At this time, when one or more personal contacts are included in the personal contact list, the public electronic device 1220 may determine the display sequence of the personal contacts. For example, the public electronic device 1220 may determine the display sequence of the personal contacts based on the communication number of times or latest communication history. A description of the display sequence will be omitted since the description thereof is described in detail through the description of FIG. 12A.

In operation 1257, the counterpart electronic device 1210 may receive the personal contact list and select at least one personal contact from the personal contact list. When one or more personal contacts are included in the personal contact list, the user himself of the counterpart electronic device 1210 may select a user account to which the outgoing call request will be made. One personal contact may be selected or one or more personal contacts may be selected.

In operation 1259, the public electronic device 1220 may receive the selected personal contacts, and store and notify of the reception information for the outgoing call request. For example, the public electronic device 1220 may transfer the reception information to the selected personal electronic device 1230 of the personal contacts. In addition, the public electronic device 1220 may store the reception information in the communication history DB.

Hereinafter, for the convenience of explanation, it is described that a user name and telephone number are included in the personal contact list. In addition, it is obvious that an e-mail address, a social network address, or various personal contacts are included in the personal contact list.

Figure 13A:
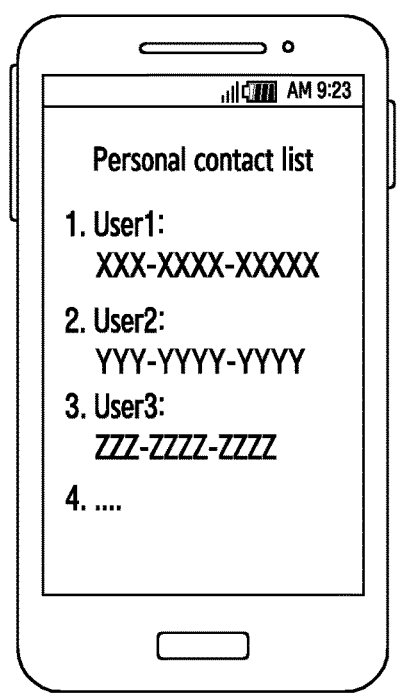
FIG. 13A and FIG. 13B are diagrams illustrating an example of a user interface of a counterpart electronic device according to various embodiments.
Figure 13B:
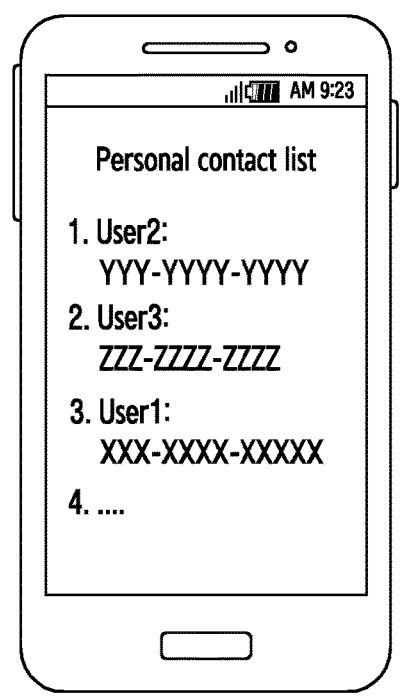

FIG. 13A and FIG. 13B are diagrams illustrating an example of a user interface of a counterpart electronic device according to various embodiments.

Referring to FIG. 13A, the counterpart electronic device 1210 may display the personal contact list received from the public electronic device 1220. For example, the personal contact list shown in FIG. 13A may be sort the personal contacts in descending order by the communication number of times. For example, the personal contact list may include personal contacts in the order of a telephone number XXX-XXXX-XXXXX of the user 1 (e.g. name), a telephone number YYYY-YYYY-YYYYY of the user 2, and a telephone number ZZZ-ZZZZ-ZZZZZ of the user 3. That is, the user 1 may be a user who has more frequent contact with the counterpart electronic device 1210 than the user 2 and user 3. The user 2 may be a user who has more frequent contact with the counterpart electronic device 1210 than the user 3.

Referring to FIG. 13B, the counterpart electronic device 1210 may display the personal contact list received from the public electronic device 1220. For example, the personal contact list shown in FIG. 13B may sort the personal contacts in the order of having the recent contact. For example, the personal contact list may include personal contacts in the order of a telephone number YYYY-YYYY-YYYYY of the user 2, a telephone number ZZZ-ZZZZ-ZZZZZ of the user 3, and a telephone number XXX-XXXX-XXXX of the user 1 (e.g. name). That is, the user 2 may be a user who has had more recent contact with the counterpart electronic device 1210 than the user 3 and user 1. The user 3 may be a user who has had relatively more recent contact with the counterpart electronic device 1210 than the user 1.

A method for operating an electronic device according to various embodiments may include: detecting a communication event; searching for a user account corresponding to the detected communication event; and when the retrieved user account is in a logged-off state, background processing the communication event, and when the retrieved user account is in a logged-on state, foreground processing the communication event.

The retrieving of the communication event may include: identifying a telephone directory in which a telephone number corresponding to the counterpart's telephone number associated with the communication event is stored; and searching for a user account having the identified telephone directory stored therein The method for operating an electronic device may further include: when the retrieved user account is in a logged-off state, determining whether there is a user account that is logged-in; and when there is a user account that is logged-in, background processing or foreground processing the communication event according to the notification setting information associated with the user account that is logged-off.

The background processing of the communication event may include: when the notification setting associated with the user account that is logged-off is blocked, controlling the communication event to be blocked and the communication event not to be displayed on the display.

The foreground processing of the communication event may include: when the notification setting associated with the user account that is logged-off is permitted, permitting the communication event and displaying the communication event on the display.

The background processing of the communication event may perform, when the retrieved user account is in a logged-off state, at least one of transmitting communication information associated with the communication event to an electronic device of a personal contact corresponding to the user account that is logged-off, transmitting absence notification message to the counterpart electronic device associated with the communication event, and storing communication information associated with the communication event in the communication history storage unit of the user account that is logged-off.

The method for operating an electronic device may further include: subtracting, from the use amount of the user account that is logged-off, the use amount according to the transmission of the communication information or transmission of the absence notification message.

The subtracting of the use amount may further include: determining whether the communication information or the absence notification message can be transmitted, by using the use amount of the user account that is logged-off, and when the transmission is not possible, adjusting the use authority information of the user account that is logged-off, by identifying the use authority information of each user account; and subtracting, from the use amount of the adjusted use authority information, the use amount according to the transmission of the communication information or transmission of the absence notification message.

The foreground processing of the communication event may include: when the retrieved user account includes a user account that is logged-in and a user account that is logged-off, displaying the communication event on the display, and transmitting the communication information associated with the communication event to an electronic device of personal contacts corresponding to the user account that is logged-off.

The foreground processing of the communication event may include: displaying the communication event on the display, and, according to the user's selection, transmitting the communication information associated with the communication event to an electronic device of personal contacts corresponding to the user account that is logged-off, or storing the communication information in the communication history storage unit of the user account that is logged-off.

The method for operating an electronic device may further include: when a telephone number corresponding to the counterpart's telephone number associated with the communication event is not retrieved, requesting the cloud server or an electronic device of each personal contact to identify the counterpart's telephone number, and receiving a response to the request from cloud server or the electronic device of each personal contact, and determining the processing of the communication event on the basis of the response.

The requesting of the identification of the counterpart's telephone number may include: successively requesting of the identification of the counterpart's telephone number based on the priority configured in the cloud server or an electronic device of the personal contact; and determining, on the basis of the response to the request, the transmission of the request to one of the cloud server or the electronic devices for each personal contact from which the request is not sent.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. An electronic device comprising:
a display;
a memory; and
a processor electrically connected to the memory and the display,
wherein the processor is configured to detect a communication event, search a one or more user accounts for a user account corresponding to the detected communication event, and when the user account corresponding to the detected communication event is in a logged-off state, background process the communication event, and when the corresponding user account is in a logged-on state, foreground process the communication event,
wherein while a first user account is in the logged-off state and a second user account is in the logged-on state, the processor is configured to block the communication event if the communication event for the first user account is detected.

2. The electronic device of claim 1, wherein the memory stores personal information for each of the one or more user accounts including at least one of a telephone directory, notification setting information, and a personal contact, and wherein the processor is configured to identify, from the memory, a telephone directory in which a telephone number corresponding to a counterpart's telephone number associated with the communication event is stored, and search for a user account having the identified telephone directory stored therein.

3. The electronic device of claim 2, wherein, when the corresponding user account is in a logged-off state, the processor is configured to determine whether there is a user account that is logged-in, and when there is a user account that is logged-in, the processor is configured to background process or foreground process the communication event according to notification setting information associated with the corresponding user account that is logged-off.

4. The electronic device of claim 3, wherein, when the notification setting information associated with the user account that is logged-off is blocked, the processor is configured to block the communication event and not to display the communication event on the display.

5. The electronic device of claim 3, wherein, when the notification setting information associated with the user account that is logged-off is permitted, the processor is configured to permit the communication event and display the communication event on the display.

6. The electronic device of claim 1, wherein, when the corresponding user account is in a logged-off state, the processor is configured to perform at least one of:
1) transmitting communication information associated with the communication event to an electronic device of a personal contact corresponding to a user account that is logged-off;
2) transmitting an absence notification message to a counterpart electronic device associated with the communication event; and 3) storing communication information associated with the communication event in a communication history storage unit of the user account that is logged-off.

7. The electronic device of claim 6, wherein the memory stores use authority information including at least one of a use authority according to a communication type for each of the one or more user accounts, a use amount according to the communication type, or call restriction information, and wherein
the processor is configured to subtract, from the use amount of the user account that is logged-off, the use amount according to the transmission of the communication information or the transmission of the absence notification message.

8. The electronic device of claim 7, wherein the processor is configured to determine whether the communication information or the absence notification message can be transmitted, by using the use amount of the user account that is logged-off, and
when the transmission thereof is not permissible, the processor may be configured to adjust the use authority information of the user account that is logged-off by identifying the use authority information of each user account, and subtract, from the use amount of the adjusted use authority information, the use amount according to the transmission of the communication information or transmission of the absence notification message.

9. The electronic device of claim 1, wherein, when the retrieved user account includes a user account that is logged-in and a user account that is logged-off, the processor is configured to display the communication event on the display, and transmit communication information associated with the communication event to an electronic device of a personal contact corresponding to the user account that is logged-off.

10. The electronic device of claim 1, wherein the processor is configured to display the communication event on the display, and, according to the user's selection, transmit communication information associated with the communication event to an electronic device of a personal contact corresponding to the user account that is logged-off, or store the communication information in a communication history storage unit of the user account that is logged-off.

11. The electronic device of claim 1, wherein, when a telephone number corresponding to a counterpart's telephone number associated with the communication event is not retrieved from the memory, the processor is configured to request identification of the counterpart's telephone number to a cloud server or an electronic device of each personal contact, and receive a response to the request from the cloud server or the electronic device of each personal contact, and determine the processing of the communication event on the basis of the response.

12. The electronic device of claim 11, wherein the processor is configured to set a priority to the cloud server or the electronic device of each personal contact, successively request for the identification of the counterpart's telephone number on the basis of the set priority, and determine, on the basis of the response to the request, to transmit the request to one of the cloud server or electronic device for each personal contact from which the request is not transmitted.

13. A method for operating an electronic device, comprising:
detecting a communication event;
searching for a user account corresponding to the detected communication event; and
when the corresponding user account is in a logged-off state, background processing the communication event, and when the corresponding user account is in a logged-on state, foreground processing the communication event,
wherein the background processing of the communication event comprises:
while a first user account is in the logged-off state and a second user account is in the logged-on state, blocking the communication event if the communication event for the first user account is detected.

14. The method of claim 13, wherein retrieving of the communication event comprises:
identifying a telephone directory in which a telephone number corresponding to a counterpart's telephone number associated with the communication event is stored; and
searching for a user account having the identified telephone directory stored therein.

15. The method of claim 13, further comprising:
when the corresponding user account is in the logged-off state, determining whether there is a user account that is logged-in; and
when there is a user account that is logged-in, background processing or foreground processing the communication event according to notification setting information associated with the user account that is logged-off.

16. The method of claim 15, wherein background processing of the communication event comprises:
when the notification setting associated with the user account that is logged-off is blocked, controlling the communication event to be blocked and the communication event not to be displayed on a display.

17. The method of claim 15, wherein foreground processing of the communication event comprises: when the notification setting associated with the user account that is logged-off is permitted, permitting the communication event and displaying the communication event on a display.

18. The method of claim 13, wherein background processing of the communication event comprises at least one of:
when the corresponding user account is in a logged-off state, transmitting communication information associated with the communication event to an electronic device of a personal contact corresponding to a user account that is logged-off;
transmitting an absence notification message to a counterpart electronic device associated with the communication event; and
storing communication information associated with the communication event in a communication history storage unit of the user account that is logged-off.

19. The method of claim 18, further comprising: subtracting, from a use amount of the user account that is logged-off, the use amount according to the transmission of the communication information or transmission of the absence notification message.

20. The method of claim 19, wherein subtracting of the use amount comprises:
determining whether the communication information or the absence notification message can be transmitted, by using the use amount of the user account that is logged-off;
when the transmission thereof is not possible, identifying use authority information of each user account to adjust the use authority information of the user account that is logged-off; and subtracting, from the use amount of the adjusted use authority information, the use amount according to the transmission of the communication information or the transmission of the absence notification message.

\* \* \* \* \*